US012812609B2

(12) United States Patent
Xiong et al.

(10) Patent No.: US 12,812,609 B2
(45) Date of Patent: Nov. 24, 2026

(54) UPLINK (UL) TRANSMISSIONS IN FULL DUPLEX (FD) SYSTEMS

(71) Applicant: Intel Products IP LLC, Santa Clara, CA (US)

(72) Inventors: Gang Xiong, Portland, OR (US); Debdeep Chatterjee, San Jose, CA (US); Yi Wang, Beijing (CN); Yingyang Li, Beijing (CN); Salvatore Talarico, Sunnyvale, CA (US); Sergey Panteleev, Kildare (IE)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/296,787

(22) Filed: Apr. 6, 2023

(65) Prior Publication Data

US 2023/0254829 A1 Aug. 10, 2023

Related U.S. Application Data

(60) Provisional application No. 63/331,536, filed on Apr. 15, 2022, provisional application No. 63/410,518, (Continued)

(51) Int. Cl.
*H04W 72/12* (2023.01)
*H04L 5/14* (2006.01)
(Continued)

(52) U.S. Cl.
CPC .......... *H04W 72/0446* (2013.01); *H04L 5/14* (2013.01); *H04W 72/0453* (2013.01); *H04W 72/21* (2023.01)

(58) Field of Classification Search
CPC .......... H04L 5/14; H04L 1/08; H04L 1/1861; H04L 1/1893; H04L 5/0005;
(Continued)

(56) References Cited

U.S. PATENT DOCUMENTS

2021/0352667 A1* 11/2021 Abotabl .......... H04W 72/0446

OTHER PUBLICATIONS

CMCC, "Discussion on evolution of duplex operation", RP-211997, 3GPP TSG RAN Meeting #93-e, (Sep. 6, 2021), 8 pages (Year: 2021).*

(Continued)

*Primary Examiner* — Lan-Huong Truong
(74) *Attorney, Agent, or Firm* — Schwegman Lundberg & Woessner, P.A.

(57) ABSTRACT

Various embodiments herein provide techniques related to a process to be performed by an electronic device. The process may include identifying one or more symbols or slots of a plurality of symbols or slots that are unavailable for transmission of an uplink signal based on an identification that: a symbol related to transmission of the signal overlaps a non-overlapped sub-band frequency-division (NOSB-FD) symbol; and one or more physical resource blocks (PRBs) related to transmission of the signal overlaps a frequency region related to transmission of the NOSB-FD symbol. The technique may further include transmitting the signal in one or more symbols or slots of the plurality of symbols or slots that are not identified as unavailable for transmission of the signal. Other embodiments may be described and/or claimed.

21 Claims, 18 Drawing Sheets

Related U.S. Application Data filed on Sep. 27, 2022, provisional application No. 63/434,832, filed on Dec. 22, 2022.

(51) Int. Cl.
*H04W 72/0446* (2023.01)
*H04W 72/0453* (2023.01)
*H04W 72/21* (2023.01)

(58) Field of Classification Search
CPC ................. H04L 5/0023; H04L 5/0044; H04L 5/0007; H04L 5/0048; H04L 5/0051; H04L 5/0053; H04L 5/0078; H04W 72/0446; H04W 72/0453; H04W 72/21; H04W 72/1268
See application file for complete search history.

(56) References Cited

OTHER PUBLICATIONS

LG Electronics, "On the scope of Rel-18 study for full duplex operation", RP-211810, 3GPP TSG RAN Meeting #93-e, (Sep. 6, 2021), 8 pgs (Year: 2021).*
3GPP, "Technical Specification Group Radio Access Network; NR; Multiplexing and channel coding (Release 17)," 3GPP TS 38.212 V17.1.0 (Mar. 2022), 5G, 197 pages.
3GPP, "Technical Specification Group Radio Access Network; NR; Physical layer procedures for control (Release 17)," 3GPP TS 38.213 V17.1.0 (Mar. 2022), 245 pages.
3GPP, "Technical Specification Group Radio Access Network; NR; Physical layer procedures for data (Release 17)," 3GPP TS 38.214 V17.1.0 (Mar. 2022), 225 pages.

* cited by examiner

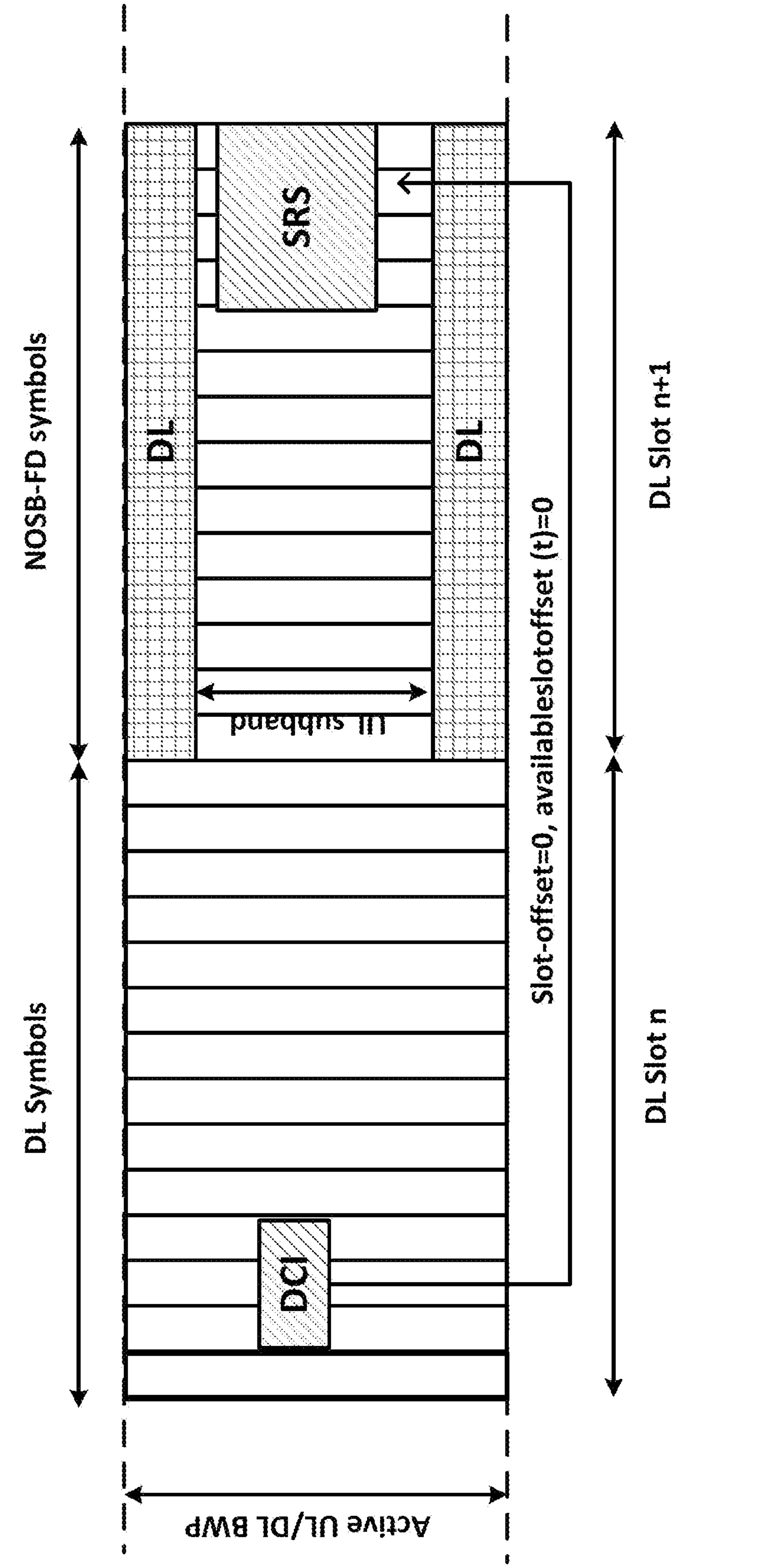
Figure 3-A

UPLINK (UL) TRANSMISSIONS IN FULL DUPLEX (FD) SYSTEMS

CROSS REFERENCE TO RELATED APPLICATION

The present application claims priority to U.S. Provisional Patent Application No. 63/331,536, which was filed Apr. 15, 2022; U.S. Provisional Patent Application No. 63/410,518, which was filed Sep. 27, 2022; and U.S. Provisional Patent Application No. 63/434,832, which was filed Dec. 22, 2022; the disclosures of which are hereby incorporated by reference.

FIELD

Various embodiments generally may relate to the field of wireless communications. For example, some embodiments may relate to uplink (UL) transmissions and, more particularly, aspects of UL transmissions in full-duplex (FD) systems.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3-A illustrates an example of a first option for available slot determination for aperiodic sounding reference signal (SRS) transmission for NOSB-FD, in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Mobile communication has evolved significantly from early voice systems to today's highly sophisticated integrated communication platform. The next generation wireless communication system, which may be referred to as fifth generation (5G) and/or new radio (NR), will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

Time Division Duplex (TDD) may be used in commercial NR deployments, where the time domain resource is split between downlink and uplink symbols. Allocation of a limited time duration for the uplink in TDD can result in reduced coverage and increased latency for a given target data rate. To improve the performance for uplink transmission in TDD system, simultaneous transmission/reception of downlink and uplink respectively, also referred to as "full duplex communication" can be considered. In this regard, the case of Non-Overlapping Sub-Band Full Duplex (NOSB-FD) at the gNodeB (gNB) may be considered.

For NOSB-FD, within a carrier bandwidth, some bandwidth can be allocated as UL, while some bandwidth can be allocated as DL within the same symbol. However the UL and DL resources may be non-overlapping in frequency domain. Under this operational mode, at a given symbol a gNB may simultaneously transmit DL signals and receive UL signals, while a UE may only transmit or receive in the NOSB-FD symbol.

Figure 1:
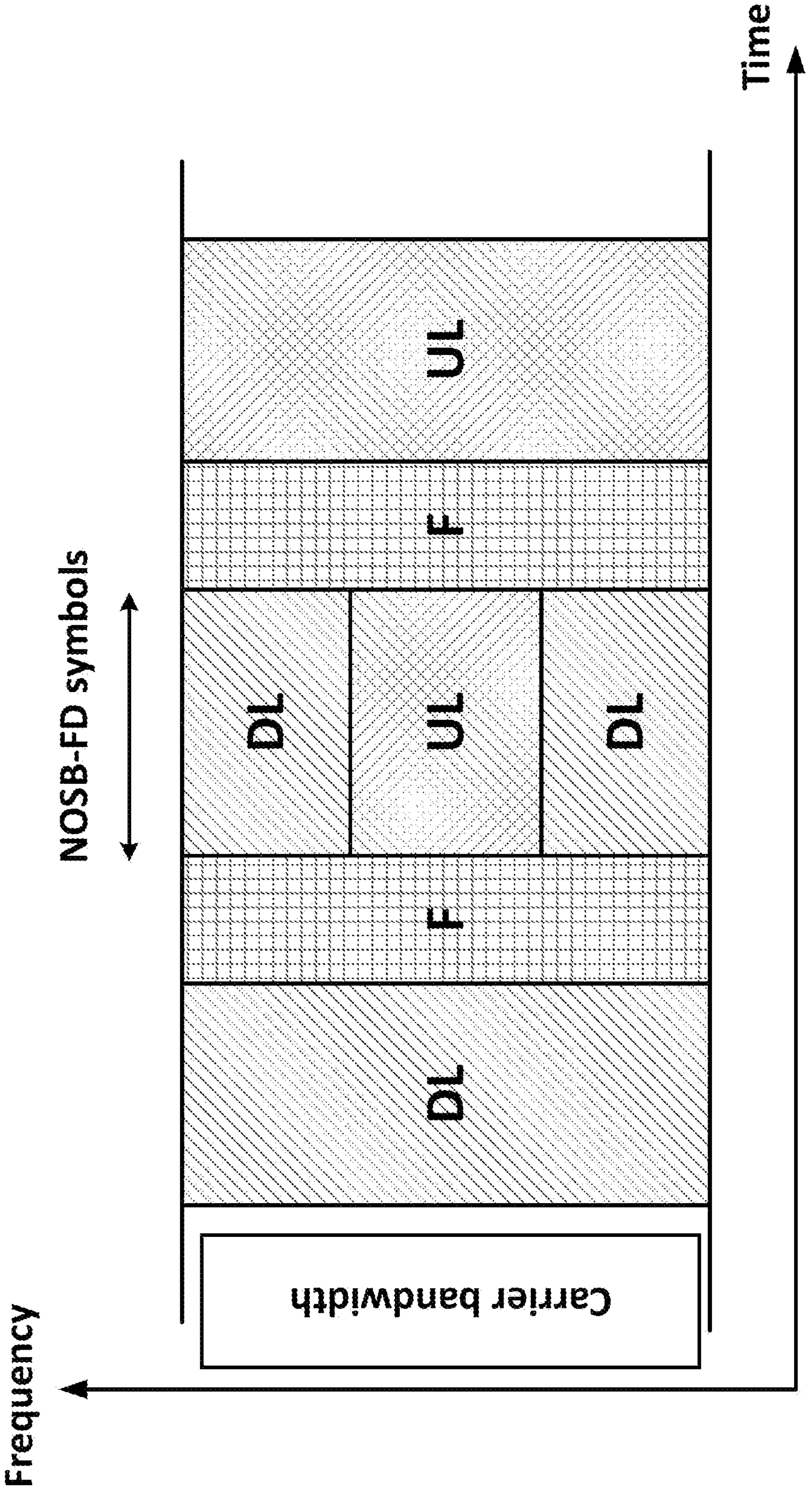
FIG. 1 illustrates an example of non-overlapping sub-band full duplex (NOSB-FD) for new radio (NR), in accordance with various embodiments.

FIG. 1 illustrates one example of Non-Overlapping Sub-Band Full Duplex (NOSB-FD) for NR system. In the figure, in the NOSB-FD symbols, part of carrier bandwidth is allocated for DL while remaining part of carrier bandwidth is allocated for UL.

In release-17 (Rel-17), for physical uplink shared channel (PUSCH) repetition type A and PUSCH transmission with transport block over multiple slots (TBoMS), counting based on available slots is supported. In particular, a two-part approach may be employed, where in the first part, a UE determines available slots for K repetitions based on radio resource control (RRC) configuration(s) in addition to time domain resource allocation (TDRA) in the downlink control information (DCI) scheduling the PUSCH, configured grant (CG) configuration or activation DCI. In the second part, the UE may determine whether to drop a PUSCH repetition or not according to release-15/release-16 (Rel-15/16) PUSCH dropping rules, but the PUSCH repetition is still counted in the K repetitions.

Note that, in the first part, the UE may determine a slot as an available slot when a PUSCH repetition does not overlap with semi-statically configured DL symbols and flexible symbols used for synchronization signal block (SSB) transmission. A similar mechanism may also be applied for physical uplink control channel (PUCCH) repetitions and sounding reference signal (SRS) transmission in unpaired spectrum. For example, the aperiodic SRS resource set triggered by a downlink control information (DCI) could be transmitted in the (t+1)-th available slot counting from a reference slot, wherein t is configured by higher-layer signaling with or without indication by DCI.

As used herein, the term "unpaired spectrum" may refer to resources that allow for TDD transmission wherein both uplink and downlink transmissions may be carried by a same frequency band.

Figure 2:
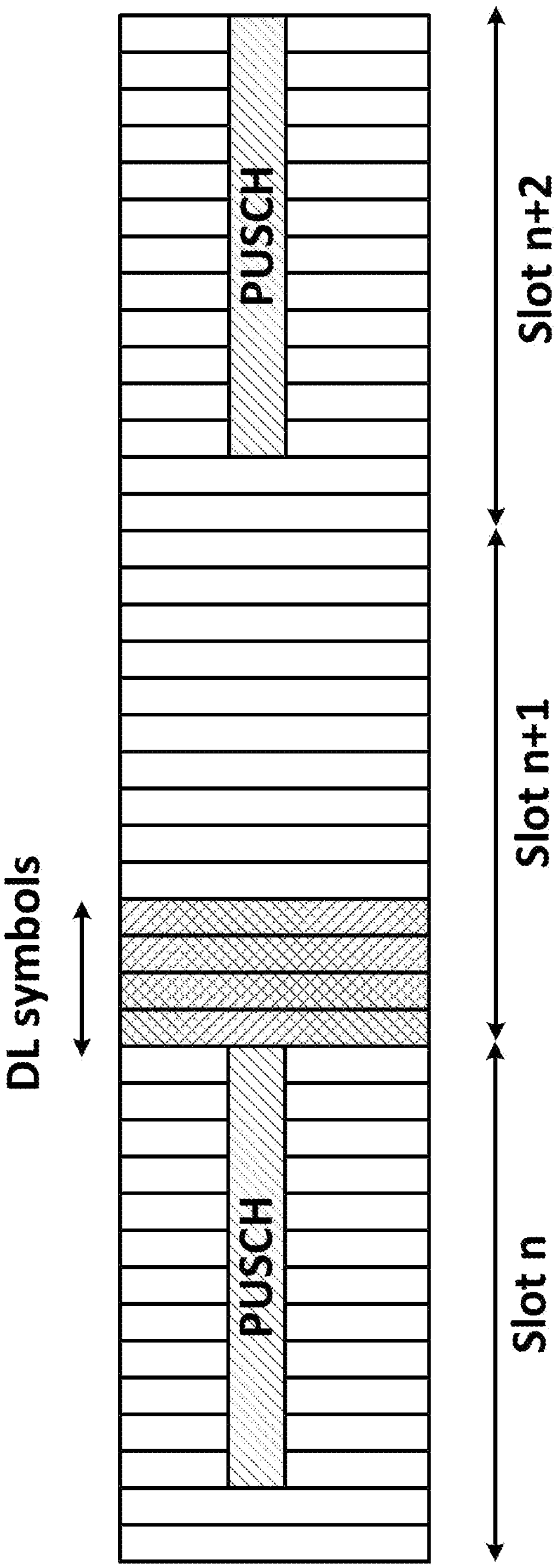
FIG. 2 illustrates an example of physical uplink shared channel (PUSCH) repetition type A with counting based on available slots, in accordance with various embodiments.

FIG. 2 illustrates one example of PUSCH repetition type A with counting based on available slots. In the figure, two PUSCH repetitions are allocated. As the allocated symbols for PUSCH transmission overlaps with DL symbols which are configured by semi-static TDD UL/DL configuration, slot #(n+1) is not available for PUSCH repetition. In this case, slot #n and slot #(n+2) are considered as available slots for PUSCH repetitions.

For full duplex communication, multi-slot PUSCH transmissions and PUCCH repetitions may be transmitted on the NOSB-FD symbols. In this case, the rule for the determination of available slots for PUSCH and PUCCH repetitions may need to be enhanced.

It will be noted that, as used herein, the terms NOSB-FD and sub-band full-duplex (SBFD) may be used interchangeably.

Embodiments herein relate to PUSCH and PUCCH repetitions and SRS for enhanced duplex operation. In particular, embodiments may relate to one or more of the following:

- PUSCH and PUCCH repetitions and SRS transmission with counting based on available slot for enhanced duplex operation.
- Invalid symbol determination for PUSCH repetition type B for enhanced duplex operation
- Validation of RACH occasion and PUSCH occasion for enhanced duplex operation Note that, in this disclosure, it is assumed that a UE may identify NOSB-FD symbols based on explicit or implicit configurations and indications, details of which may be beyond the scope of this discussion.

PUSCH and PUCCH Repetitions and SRS Transmissions with Counting Based on Available Slot for Duplex Operation As mentioned above, in Rel-17, for PUSCH repetition type A and PUSCH transmission with transport block over multiple slots (TBoMS), counting based on available slots is supported. In particular, a two-part approach may be employed, where in the first part, a UE determines available slots for K repetitions based on radio resource control (RRC) configuration(s) in addition to time domain resource allocation (TDRA) in the downlink control information (DCI) scheduling the PUSCH, configured grant (CG) configuration, or activation DCI. In the second part, the UE determines whether to drop a PUSCH repetition or not according to Rel-15/16 PUSCH dropping rules, but the PUSCH repetition is still counted in the K repetitions.

Note that, in the first part, in TDD system or unpaired spectrum, UE determines a slot as an available slot when PUSCH repetition does not overlap with semi-statically configured DL symbols and flexible symbols used for synchronization signal block (SSB) transmission. A similar mechanism may also be applied for physical uplink control channel (PUCCH) repetitions and SRS transmissions in TDD system or unpaired spectrums.

For full duplex communication, multi-slot PUSCH transmissions and PUCCH repetitions and SRS may be transmitted on the NOSB-FD symbols. In this case, the rule for the determination of available slots for PUSCH and PUCCH repetitions may need to be enhanced. In the following, if gNB provides subband information for NOSB-FD in a symbol, it is denoted as NOSB-FD symbol, otherwise, the symbol is a non-NOSB-FD symbol such as a DL or UL symbol. For example, if gNB does not provide subband information for a symbol which is indicated as DL by tdd-UL-DLConfigurationCommon or tdd-UL-DL-ConfigurationDedicated, it is identified as a DL symbol indicated by tdd-UL-DLConfigurationCommon or tdd-UL-DL-ConfigurationDedicated.

Note that, for the following embodiments, multi-slot PUSCH transmission includes PUSCH repetition type A, TB processing over multiple slot PUSCH (TBoMS), and/or Msg3 repetition for initial transmission and retransmission.

Example embodiments of PUSCH and PUCCH repetitions on available slots for duplex operation are provided as follows:

(Option 1) In one embodiment, for unpaired spectrum, for the determination of available slots for multi-slot PUSCH transmission or PUCCH repetitions, a slot is not counted as available slot:

- if at least one of the symbols indicated for a PUSCH or a PUCCH transmission of the multi-slot PUSCH transmission or PUCCH repetitions (respectively) overlaps with an NOSB-FD symbol and all the PRBs allocated for the PUSCH or the PUCCH transmission are not included within the UL subband; and/or

- if at least one of the symbols indicated for a PUSCH or a PUCCH transmission of the multi-slot PUSCH transmission or PUCCH repetitions (respectively) overlaps with an NOSB-FD symbol and at least one PRB allocated for the PUSCH or the PUCCH transmission falls within a DL subband if a DL subband is indicated explicitly or implicitly for a NOSB-FD symbol; and/or
- if at least one of the symbols indicated for a PUSCH or a PUCCH transmission of the multi-slot PUSCH transmission or PUCCH repetitions (respectively) overlaps with a DL symbol indicated by tdd-UL-DLConfigurationCommon or tdd-UL-DL-ConfigurationDedicated if provided, or a symbol of an SS/PBCH block.

Alternatively, for unpaired spectrum, for the determination of available slots for multi-slot PUSCH transmission or PUCCH repetitions, a slot is not counted as available slot if one or more of the following are true. It will be noted that these are example situations, and other embodiments may include additional/alternative situations:

- if at least one of the symbols indicated for a PUSCH or a PUCCH transmission of the multi-slot PUSCH transmission or PUCCH repetitions (respectively) overlaps with an NOSB-FD symbol and all the PRBs allocated for the PUSCH or the PUCCH transmission are not included within the UL subband; and/or
- if at least one of the symbols indicated for a PUSCH or a PUCCH transmission of the multi-slot PUSCH transmission or PUCCH repetitions (respectively) overlaps with an NOSB-FD symbol and at least one PRB allocated for the PUSCH or the PUCCH transmission falls within a DL subband if a DL subband is indicated explicitly or implicitly for a NOSB-FD symbol; and/or
- if at least one of the symbols indicated for a PUSCH or a PUCCH transmission of the multi-slot PUSCH transmission or PUCCH repetitions (respectively) overlaps with an NOSB-FD symbol and at least one PRB allocated for the PUSCH or the PUCCH transmission falls within a guard band if a guard band is indicated explicitly or implicitly for a NOSB-FD symbol; and/or
- if at least one of the symbols indicated for a PUSCH or a PUCCH transmission of the multi-slot PUSCH transmission or PUCCH repetitions (respectively) overlaps with a DL symbol indicated by tdd-UL-DLConfigurationCommon or tdd-UL-DL-ConfigurationDedicated if provided.

Further, this option may apply for the case when frequency resource and numerology for active UL bandwidth part (BWP) used for the transmission of multi-slot PUSCH transmission and PUCCH repetitions are same as that for UL subband of NOSB-FD. These may imply same values of subcarrier spacing (SCS), cyclic prefix (CP) type, starting physical resource block (PRB), and number of PRBs for active UL BWP and UL subband for NOSB-FD. This option may also apply for the case when frequency resource for active UL bandwidth part (BWP) used for the transmission of multi-slot PUSCH transmission and PUCCH repetitions is different from the UL subband of NOSB-FD.

Figure 3:
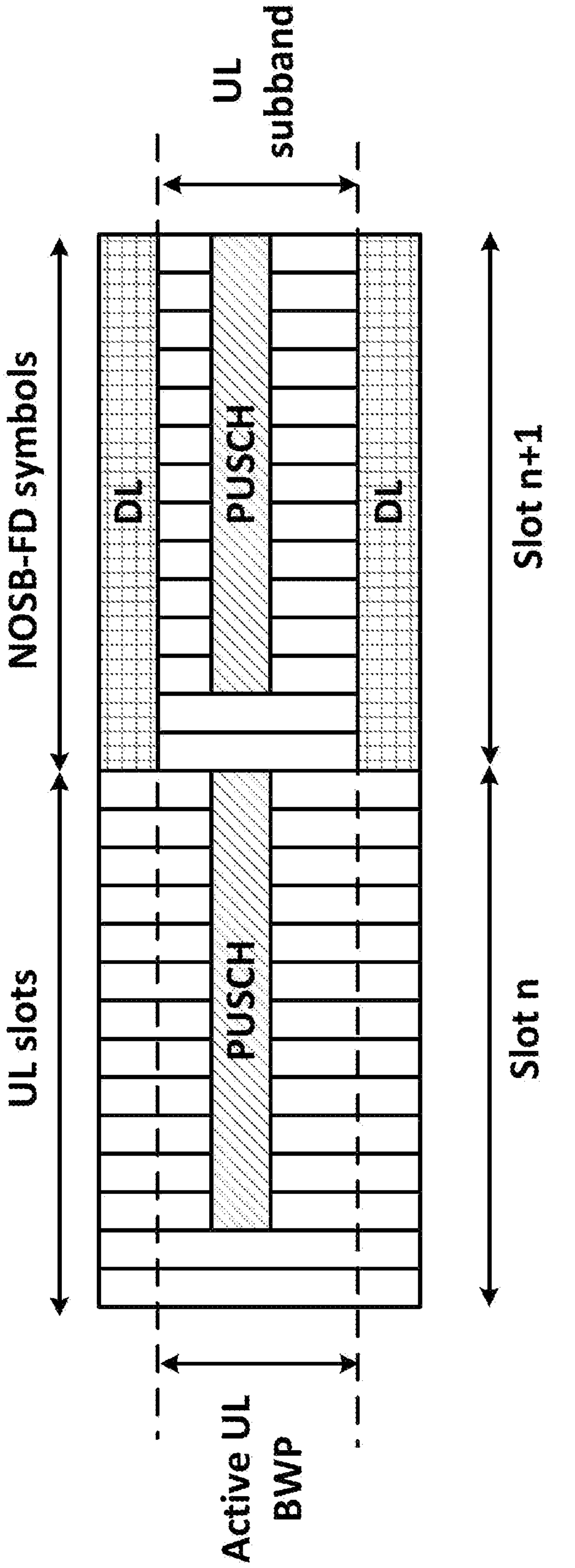
FIG. 3 illustrates an example of a first option for available slot determination for PUSCH repetition type A for NOSB-FD, in accordance with various embodiments.

FIG. 3 illustrates one example of available slot determination for PUSCH repetition type A for NOSB-FD. In the example, same frequency resource is allocated for active UL BWP and UL subband for NOSB-FD. In addition, 2 repetitions are allocated for PUSCH transmissions with counting based on available slots. In this case, allocated resource for PUSCH transmission is within the UL subband in NOSB-FD symbols. Based on the rule as defined above, slots #n and #(n+1) are determined as available slots for PUSCH repetitions.

Similarly, for SRS transmission in unpaired spectrum, for the determination of available slot for SRS in each of the SRS resource set(s), a slot is not counted as available slot if one or more of the following are true. It will be noted that these may be considered example situations, and, in other embodiments, one or more additional or alternative situations may be present:

- if at least one of the symbols indicated for an SRS resource within the SRS resource set overlaps with an NOSB-FD symbol and all the PRBs allocated for the SRS are not included within the UL subband; and/or
- if at least one of the symbols indicated for an SRS resource within the SRS resource set overlaps with an NOSB-FD symbol and at least one PRB allocated for the SRS falls within a DL subband if a DL subband is indicated explicitly or implicitly for a NOSB-FD symbol; and/or
- if at least one of the symbols indicated for an SRS resource within the SRS resource set overlaps with an NOSB-FD symbol and at least one PRB allocated for the SRS falls within a guard band if a guard band is indicated explicitly or implicitly for a NOSB-FD symbol; and/or
- if at least one of the symbols indicated for an SRS resource within the SRS resource set overlaps with a DL symbol (non-NOSB-FD symbol) or a symbol of an SS/PBCH block; and/or
- the minimum timing requirement based on UE capability between triggering PDCCH and all the SRS resources in the resource set is not satisfied.

Alternatively, for SRS transmission in unpaired spectrum, for the determination of available slot for SRS in each of the SRS resource set(s), a slot is not counted as available slot if one or more of the following is true. It will be noted that these are considered example situations and, in other embodiments, one or more additional or alternative situations may be present that may have a similar result:

- if at least one of the symbols indicated for an SRS resource within the SRS resource set overlaps with an NOSB-FD symbol and all the PRBs allocated for the SRS are not included within the UL subband; and/or
- if at least one of the symbols indicated for an SRS resource within the SRS resource set overlaps with an NOSB-FD symbol and at least one PRB allocated for the SRS falls within a DL subband if a DL subband is indicated explicitly or implicitly for a NOSB-FD symbol; and/or
- if at least one of the symbols indicated for an SRS resource within the SRS resource set overlaps with an NOSB-FD symbol and at least one PRB allocated for the SRS falls within a guard band if a guard band is indicated explicitly or implicitly for a NOSB-FD symbol; and/or
- if at least one of the symbols indicated for an SRS resource within the SRS resource set overlaps with a DL symbol; and/or
- the minimum timing requirement based on UE capability between triggering PDCCH and all the SRS resources in the resource set is not satisfied.

For above cases, in one example, the DL symbol is semi-statically determined, e.g., DL symbol indicated by tdd-UL-DLConfigurationCommon or tdd-UL-DL-ConfigurationDedicated if provided. In another example, the DL symbol can be semi-statically or dynamically determined, e.g., according to SFI or dynamic NOSB-FD symbol/non-NOSB-FD symbol switch indication or dynamic scheduling.

For above cases, in one example, if SRS transmissions within the SRS resource set may include both non-NOSB-FD and NOSB-FD symbols, the slot is not counted as available slot. In another example, whether a slot is counted as available slot for SRS transmission does not depend on whether the SRS transmissions include both non-NOSB and NOSB-FD symbols.

If the SRSs is triggered by a DCI, from the first symbol carrying the SRS request DCI to the last symbol of the triggered SRS resource set, UE does not expect to receive any dynamic indication that may change the determination of available slot, e.g., dynamic indication for NOSB-FD and non-NOSB-FD symbol switch.

FIG. 3-A illustrates one example of available slot determination for aperiodic SRS for NOSB-FD. Assuming a DCI in DL slot n triggers aperiodic SRS resources of a SRS resource set with slotOffset (k)=0 and availableSlotOffset (t)=0. Then, the reference slot is n+k, and the slot for the triggered aperiodic SRS resources is (t+1)-th available slot counting from the reference slot. Since slot n is DL slot with DL symbols (non-NOSB-FD symbols) and slot n+1 is DL slot with NOSB-FD symbols, and the allocated resources for the triggered SRS resources is within the UL subband in NOSB-FD symbols in DL slot n+1, and the minimum timing requirement can be met, the DL slot n+1 is counted as available slot for SRS transmission based on the rule as defined above.

(Option 2) In another embodiment, for unpaired spectrum, for the determination of available slots for multi-slot PUSCH transmission or PUCCH repetitions, a slot is not counted as available slot if one or more of the following is true. As in other discussion herein, it will be noted that these considerations are intended as example considerations, and one or more additional/alternative considerations may be present in other embodiments:

- if at least one of the symbols indicated for a PUSCH or a PUCCH transmission of the multi-slot PUSCH transmission or PUCCH repetitions (respectively) overlaps with an NOSB-FD symbol and all the PRBs allocated for the PUSCH or the PUCCH transmission are not included within the UL subband; and/or
- if at least one of the symbols indicated for a PUSCH or a PUCCH transmission of the multi-slot PUSCH transmission or PUCCH repetitions (respectively) overlaps with an NOSB-FD symbol and at least one PRB allocated for the PUSCH or the PUCCH transmission falls within a DL subband if a DL subband is indicated explicitly or implicitly for a NOSB-FD symbol; and/or
- if at least one of the symbols indicated for a PUSCH or a PUCCH transmission of the multi-slot PUSCH transmission or PUCCH repetitions (respectively) overlaps with a DL symbol indicated by tdd-UL-DLConfigurationCommon or tdd-UL-DL-ConfigurationDedicated if provided, or a symbol of an SS/PBCH block; and/or
- if the gap between last symbol of a PUSCH or a PUCCH transmission of the multi-slot PUSCH transmission or PUCCH repetitions (respectively) in the previous slot and the first symbol of a PUSCH or a PUCCH transmission of the multi-slot PUSCH transmission or PUCCH repetitions (respectively) is less than a threshold when the last symbol of the PUSCH or PUCCH in the previous slot and the first symbol of the PUSCH or PUCCH in the current slot are mapped to UL symbol or NOSB-FD symbols respectively (or vice-versa).

In another example of the embodiment, the last condition may be generalized as:

- if the gap between last symbol of an UL transmission in the previous slot and the first symbol of a PUSCH or a PUCCH transmission of the multi-slot PUSCH transmission or PUCCH repetitions (respectively) is less than a threshold when the last symbol of the UL transmission in the previous slot and the first symbol of the PUSCH or PUCCH in the current slot are mapped to UL symbol or NOSB-FD symbols respectively (or vice-versa).

The threshold may be defined as number of symbols or slots, and/or some other number of cellular communication time divisions, where the symbol or slot duration is determined in accordance with the subcarrier spacing for the active UL BWP and/or UL subband for NOSB-FD symbols. In another option, the threshold may be defined as an absolute time in a unit of millisecond (ms), microsecond (µs), and/or some other unit of time.

Yet in another option, the threshold may be configured by higher layers via NR remaining minimum system information (RMSI), NR other system information (OSI) or dedicated radio resource control (RRC) signalling. This can be defined based on UE capability, e.g., on the switching delay between active UL BWP and UL subband for NOSB-FD.

Note that the above embodiment (Option 2) and its examples may apply for the case when frequency resource for active UL BWP used for the transmission of multi-slot PUSCH transmission and PUCCH repetitions is different from the UL subband for NOSB-FD operation. Additionally or alternatively, the above embodiment (Option 2) and its examples may apply for the case when a UE is expected to use different values of nominal bandwidth (BW) and/or center frequency for transmitter side filtering in an UL symbol (that corresponds to location and BW of active UL BWP) and in an NOSB-FD symbol (that corresponds to location and BW of the UL subband in NOSB-FD symbol).

Figure 4:
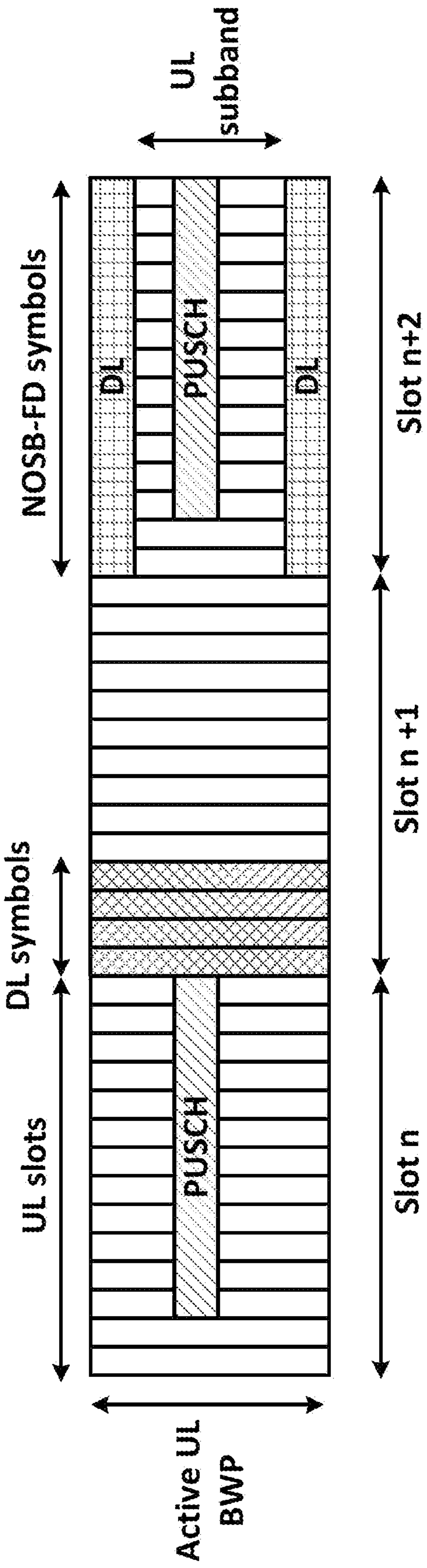
FIG. 4 illustrates a first example of a second option for available slot determination for PUSCH repetition type A for NOSB-FD, in accordance with various embodiments.

FIG. 4 illustrates one example of available slot determination for PUSCH repetition type A for NOSB-FD. In the example, two repetitions are allocated for PUSCH transmissions with counting based on available slots. In addition, different frequency resource is allocated for active UL BWP and UL subband for NOSB-FD. The threshold for the determination of available slot is assumed as 7 symbols. In this case, as PUSCH repetition overlaps with semi-statically configured DL symbols in slot n+1, slot n+1 is not counted as available slot. Further, the gap between ending symbol of the first PUSCH repetition in slot n and starting symbol of PUSCH repetition in slot n+2 is greater than the threshold, slot n+2 is counted as available slot for PUSCH repetition.

Figure 5:
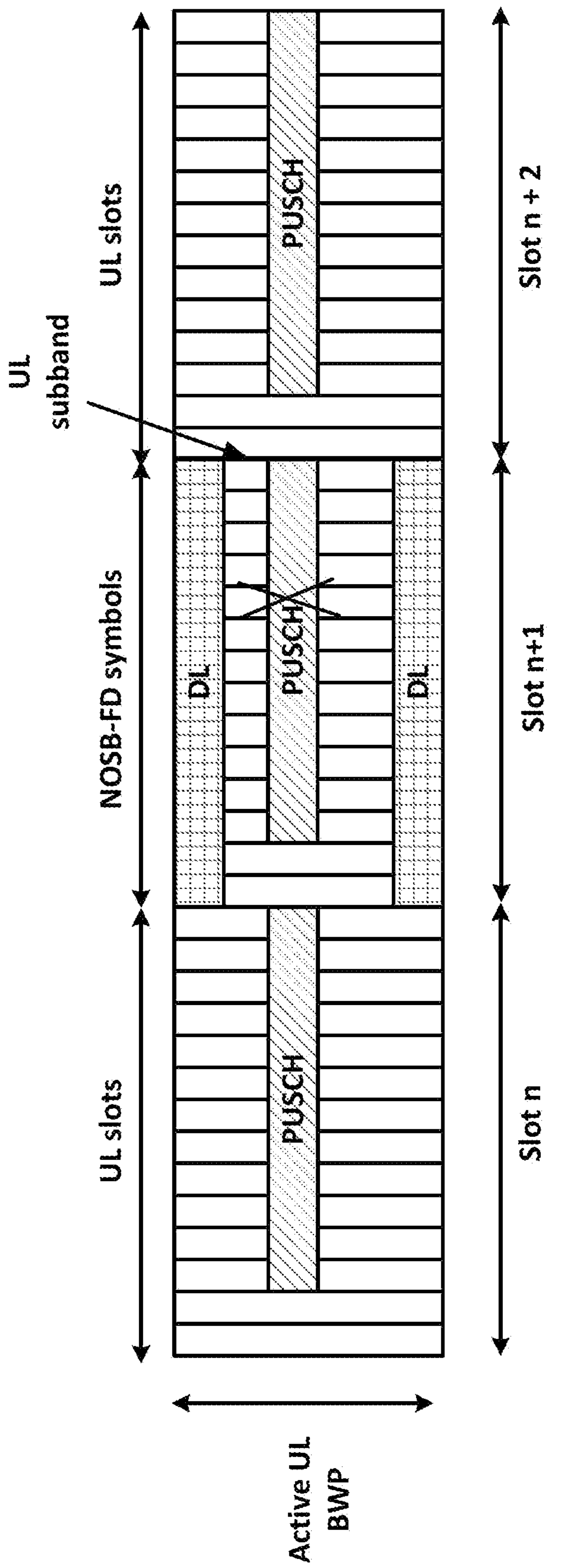
FIG. 5 illustrates a second example of a second option for available slot determination for PUSCH repetition type A for NOSB-FD, in accordance with various embodiments.

FIG. 5 illustrates one example of available slot determination for PUSCH repetition type A for NOSB-FD. In the example, 2 repetitions are allocated for PUSCH transmissions with counting based on available slots. In addition, different frequency resource is allocated for active UL BWP and UL subband for NOSB-FD. The threshold for the determination of available slot is assumed as 7 symbols. In this case, given that the gap between ending symbol of the first PUSCH repetition in slot n and starting symbol of PUSCH repetition in slot n+1 is less than the threshold, slot n+1 is not counted as available slot for PUSCH repetition. Further, slot n and slot n+2 are counted as available slot for PUSCH repetition.

In another embodiment, when numerology for active UL bandwidth part (BWP) used for the transmission of multi-slot PUSCH transmission and PUCCH repetitions is different from the UL subband for NOSB-FD operation, a slot is not counted as an available slot if the symbols for PUSCH and PUCCH transmission overlaps with the NOSB-FD symbols.

In another embodiment, a UE may not expect to be configured with NOSB-FD operation such that the numerology (comprising of SCS and cyclic prefix (CP) type) used in the UL subband in an NOSB-FD symbol is different from that configured for the active UL BWP. In a further example, in case a UE is configured with different SCS values between active DL and UL BWPs with the same BWP index, the UE may expect that the UL subband in an NOSB-FD symbol is configured with the same SCS value as the active UL BWP.

It will be noted that, in some cases, one or more of the above embodiments for option 2 may also be applied for SRS transmission. Additionally or alternatively, one or more of the above embodiments may also be applied for half-duplex FDD (HD-FDD) case.

Invalid Symbol Determination for PUSCH Repetition Type B for Duplex Operation

Example embodiments of invalid symbol determination for PUSCH repetition type B for duplex operation are provided as follows:

In one embodiment, for PUSCH repetition type B in unpaired spectrum, a symbol may be determined as invalid symbol if one or more of the following are true. It will be noted that the following are intended as example factors, and other embodiments may additionally/alternatively include one or more different factors:

- if the symbol overlaps with an NOSB-FD symbol and all the allocated PRBs for the PUSCH repetition are not included within the UL subband in the NOSB-FD symbol, or
- if the symbol overlaps with an NOSB-FD symbol and at least one PRB allocated for the PUSCH repetition falls within a DL subband if a DL subband is indicated explicitly or implicitly for a NOSB-FD symbol.

Note that this option may apply for the case when frequency resource for active UL BWP used for the transmission of PUSCH repetition type B is same as that for UL subband of NOSB-FD. This may include same numerology, starting physical resource block (PRB) and number of PRBs for active UL BWP and UL subband for NOSB-FD. Further, it should be noted that this condition may be applied in addition to the set of conditions to determine invalid symbols for PUSCH repetition type B defined in Rel-17 3GPP specifications in TS 38.214.

In another embodiment, for PUSCH repetition type B in unpaired spectrum, a symbol may be determined as invalid symbol if one or more of the following is true. It will be noted that theses considerations are intended as examples, and other embodiments may have different considerations:

- if the symbol overlaps with a NOSB-FD symbol and all the allocated PRBs for the PUSCH repetition are not included within the UL subband in the NOSB-FD symbol; and/or
- if the symbol overlaps with an NOSB-FD symbol and at least one PRB allocated for the PUSCH repetition falls within a DL subband if a DL subband is indicated explicitly or implicitly for a NOSB-FD symbol; and/or
- if, for a nominal repetition starting in an UL or flexible symbol, the UL or flexible symbol is within K symbols before a first NOSB-FD symbol in which the UE is expected to transmit in the UL; and/or
- if, for a nominal repetition starting in an NOSB-FD symbol, the NOSB-FD symbol is within K symbols before a first UL or flexible symbol in which the UE is expected to transmit in the UL;

where the value of K may be determined in accordance with the subcarrier spacing for the active UL BWP and/or UL subband for NOSB-FD symbols based on a minimum time gap for switching between active UL BWP and UL subband in NOSB-FD symbol.

Note that this embodiment may apply for the case when frequency resource for active UL BWP used for the transmission of PUSCH repetition type B is different from the UL subband for NOSB-FD operation. Additionally or alternatively, the above embodiment may apply for the case when a UE is expected to use different values of nominal bandwidth (BW) and/or center frequency for transmitter side filtering in an UL symbol (that corresponds to location and BW of active UL BWP) and in an NOSB-FD symbol (that corresponds to location and BW of the UL subband in NOSB-FD symbol).

Further, it should be noted that this condition may be applied in addition to the set of conditions to determine invalid symbols for PUSCH repetition type B defined in the Release-17 (Rel-17) third generation partnership project (3GPP) specifications in technical specification (TS) 38.214.

Figure 6:
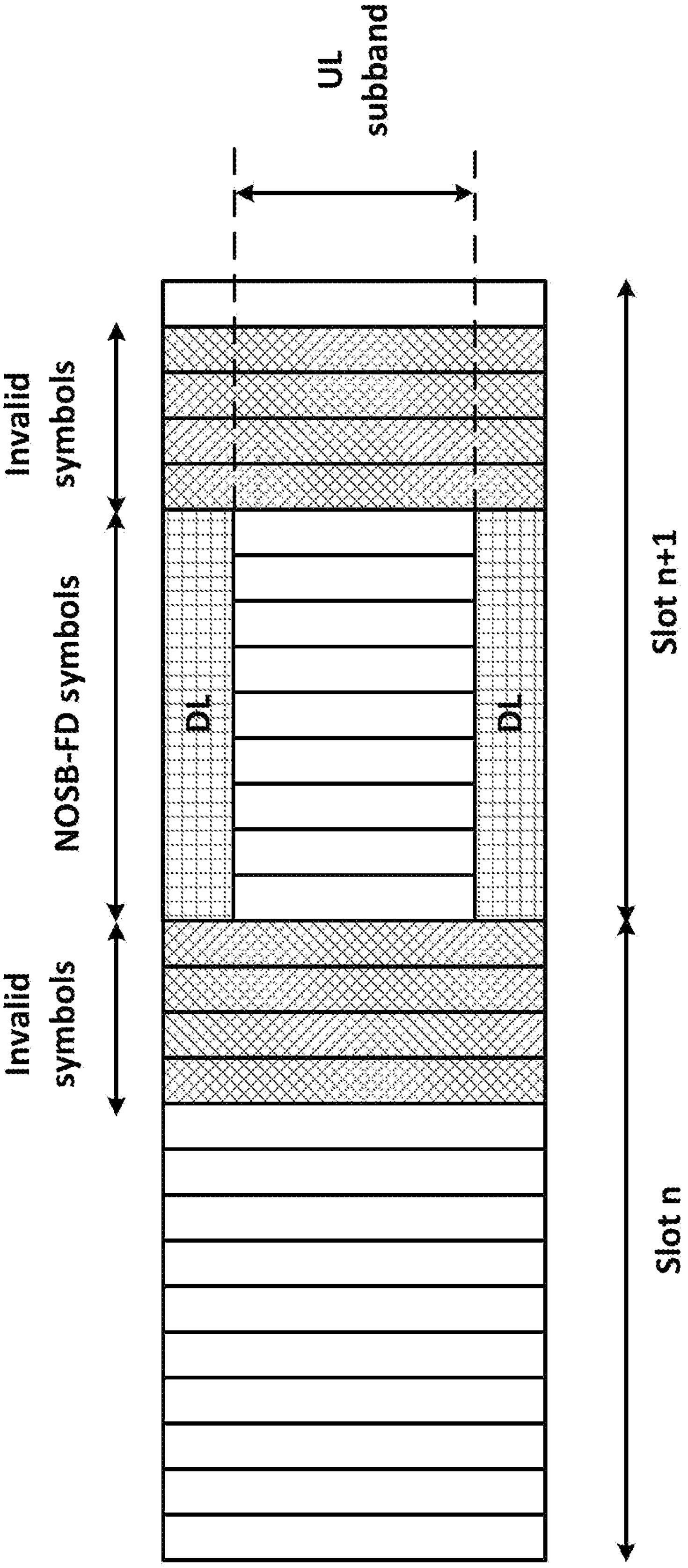
FIG. 6 illustrates an example of invalid symbols for PUSCH repetition type B for NOSB-FD, in accordance with various embodiments.

FIG. 6 illustrates one example of invalid symbols for PUSCH repetition type B for NOSB-FD. In the example, assuming K=4 symbols, based on this option, last 4 symbols in slot n, and symbol (#9-12) in slot n+1 are determined as invalid symbols for PUSCH repetition type B.

In another embodiment, when numerology for active UL BWP used for the transmission of PUSCH repetition type B is different from the UL subband for NOSB-FD operation, the symbol is determined as invalid symbol if the symbols for PUSCH and PUCCH transmission overlaps with the NOSB-FD symbols.

Note that the above embodiments may also be applied for half-duplex FDD (HD-FDD) case.

Validation of RACH Occasion and PUSCH Occasion for Duplex Operation

Example embodiments of validation of RACH occasion and PUSCH occasion for duplex operation are provided as follows:

In one embodiment, for both Type 1 (4-step RACH) and Type 2 (2-step RACH) random access procedure in unpaired spectrum, if a UE is provided tdd-UL-DL-Configuration-Common, a PRACH occasion in a PRACH slot is valid if one or more of the following are true (or, in other embodiments, one or more additional or alternative factors may be used):

- the PRACH occasion is within UL symbols or flexible symbols as indicated by tdd-UL-DL-Configuration-Common; or
- the PRACH occasion is within NOSB-FD symbols and the frequency resource of the PRACH occasion is within UL subband of NOSB-FD.

In a further example of the embodiment, whether PRACH occasion is valid if it is within NOSB-FD symbols can be configured by higher layers via RMSI or system information block 1 (SIB1).

Further, it should be noted that this condition may be applied in addition to the set of conditions to determine valid PRACH occasion defined in Rel-17 3GPP specifications in TS 38.213.

In one embodiment, PRACH occasions overlapping with one or more SBFD symbols may be configured by higher layers via RMSI or SIB1 or via dedicated RRC signaling for a UE that supports SBFD operations. In this case, when the UE transmits the PRACH in the PRACH occasions overlapping with one or more SBFD symbols during 2-part or 4-part RACH procedure, after successful detection of the PRACH, gNB may identify the UE as capable of SBFD operations.

In another option, PRACH occasions which do not overlap with SBFD symbols may be configured via RMSI or SIB1 or via dedicated RRC signaling for a UE that supports SBFD operations.

In another option, both PRACH occasions which overlap with one or more SBFD symbols and do not overlap with SBFD symbols may be configured via RMSI or SIB1 or via dedicated RRC signaling for a UE that supports SBFD operations.

In some aspects, separate PRACH parameters including power control parameters, association between SSB and PRACH occasions, number of FDM-ed RACH occasions, etc., may be configured for the PRACH occasions overlapping with one or more SBFD symbols, which can be different from that for the configuration for PRACH occasions within non-SBFD symbols. In case when the PRACH parameters are not configured for the PRACH occasions overlapping with one or more SBFD symbols, the default parameters can be determined based on the configuration for PRACH occasions within non-SBFD symbols.

In some aspects, separate PRACH occasions can be configured for the UEs that support SBFD operations with separate parameters for mapping ratio between SSB and PRACH occasions for the PRACH occasions within SBFD symbols and number of FDM-ed RACH occasions. More specifically, when the number N SSB is associated with PRACH occasion within non-SBFD symbols and N>1, the number N1 SSB that is associated with the PRACH occasion within SBFD symbols should be $N_1 \leq N$. Further, when the number N SSB is associated with PRACH occasion within non-SBFD symbols and N≤1, the number N1 SSB that is associated with the PRACH occasion within SBFD symbols should be $N_1 \leq 1$.

Figure 8:
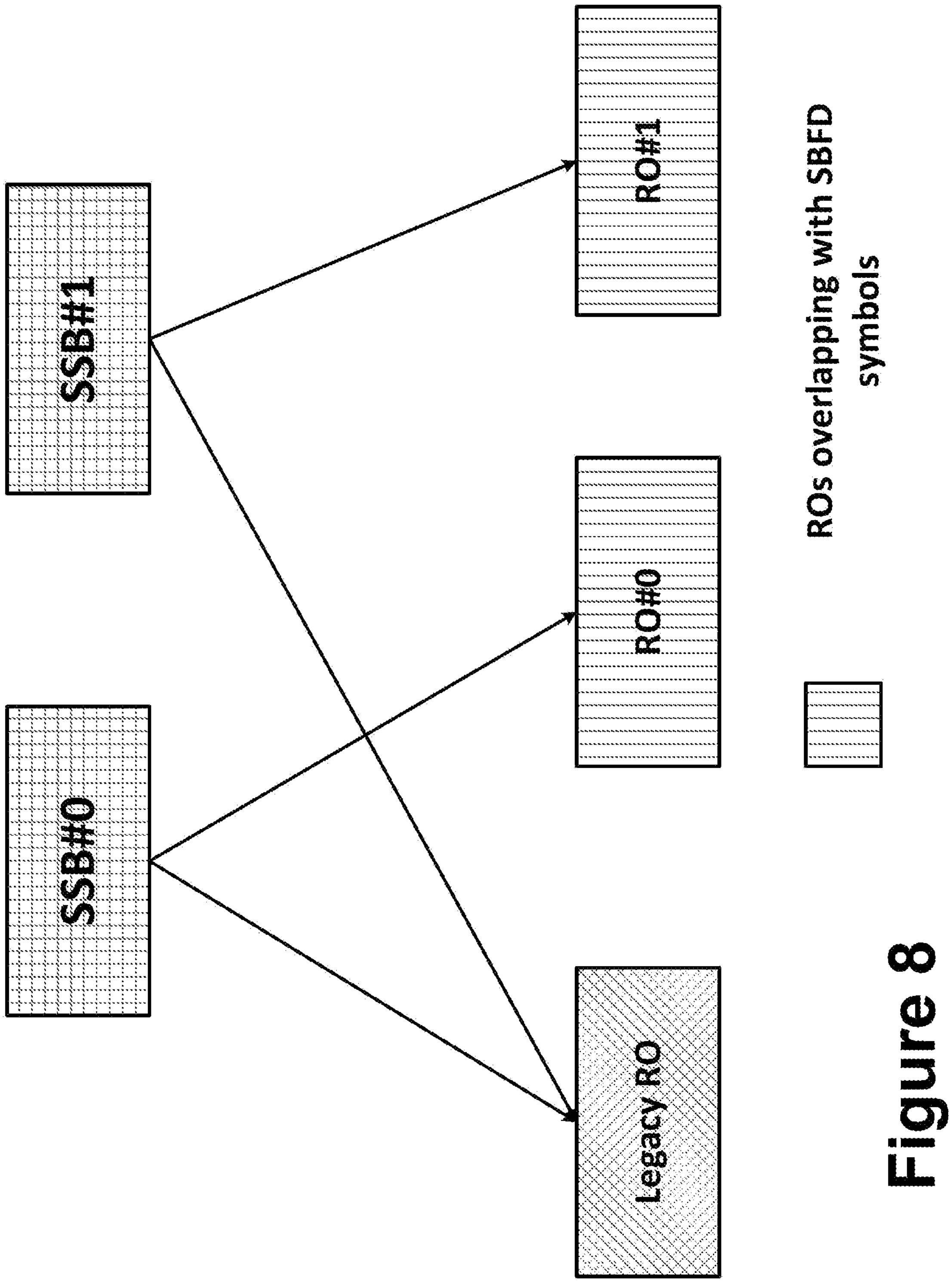
FIG. 8 depicts a first example association between one or more synchronization signal blocks (SSBs), one or more legacy random access channel (RACH) occasions (ROs), and one or more ROs that overlap with one or more sub-band full duplex (SBFD) symbols, in accordance with various embodiments.

FIG. 8 illustrates one example of association between SSB and legacy ROs and ROs overlapping with SBFD symbols. In the example, 2 SSBs are associated with 1 legacy RO, i.e., N=2. Further, based on the configuration, 1 SSB is associated with 1 RO overlapping with SBFD symbols.

Figure 9:
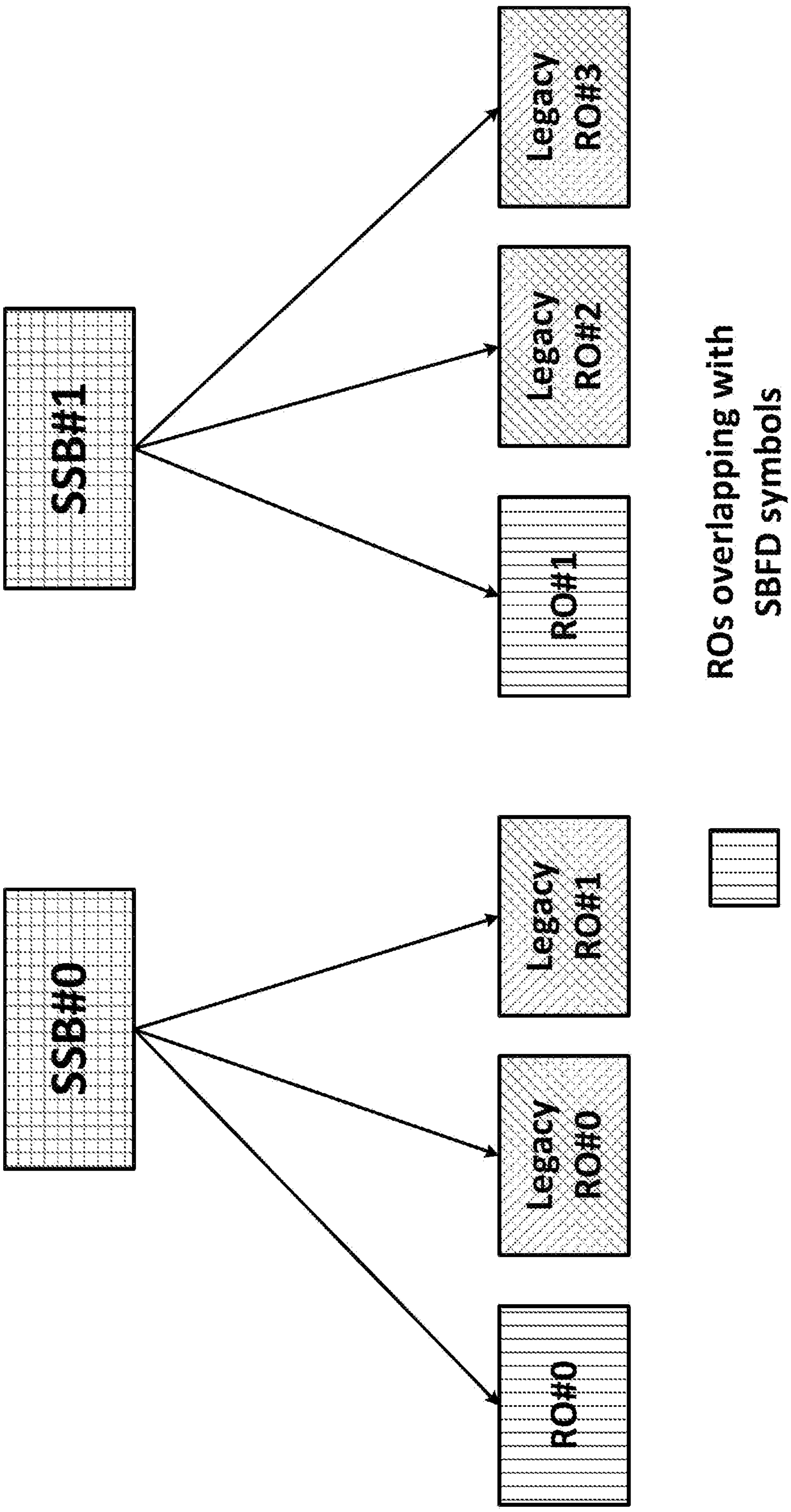
FIG. 9 depicts a second example association between one or more SSBs, one or more legacy RACH ROs, and one or more ROs that overlap with one or more SBFD symbols, in accordance with various embodiments.

FIG. 9 illustrates one example of association between SSB and legacy ROs and ROs overlapping with SBFD symbols. In the example, 1 SSB is associated with 1 legacy RO, i.e., N=2. Further, based on the configuration, 1 SSB is associated with 2ROs overlapping with SBFD symbols.

In another embodiment, when shared PRACH occasions are configured for the UEs that support SBFD operations and the UEs that do not support SBFD operation, separate PRACH preambles in the shared PRACH occasions can be allocated for the UEs that support SBFD operations and the UEs that do not support SBFD operation. When the UE transmits the PRACH using the configured PRACH preambles for SBFD operation, after successful detection of the PRACH, gNB may identify the UE that supports the SBFD operations.

For this option, the starting PRACH preambles and the number of PRACH preambles associated with an SSB can be configured for the UEs that support SBFD operations. In case when both 2-step RACH and 4-step RACH are configured for SBFD operation, separate PRACH preambles can be configured for 2-step RACH and 4-step RACH for the UEs that support SBFD operations, respectively.

In some aspects, the shared PRACH occasions may be configured within non-SBFD symbols.

In an embodiment, a UE may use either only a first type of PRACH occasions that are mapped to non-SBFD symbols or only a second type of PRACH occasions overlapping with one or more SBFD symbols, but not both, across different PRACH attempts depending on which type of PRACH occasions was used for the first PRACH attempt.

In another embodiment, a UE may use either a first type of PRACH occasions that are mapped to non-SBFD symbols or a second type of PRACH occasions overlapping with one or more SBFD symbols across different PRACH attempts, regardless of the type of PRACH occasions was used for the first PRACH attempt. In a further example, if switching from a first type of PRACH occasions to a second type of PRACH occasions or vice versa while making a successive PRACH transmission attempt, the PRACH transmission power level is increased according to the power ramping parameters associated with the type of PRACH occasions for the new attempt with an adjustment of the previous value of the transmission power that takes into account: (i) the difference between the target PRACH power levels for the two types of PRACH occasions and (ii) the difference between the PRACH power ramping step sizes for the two types of PRACH occasions, scaled by the number of PRACH attempts in the previous type of PRACH occasions.

In another example, a UE may not expect a PRACH occasion to overlap with a DL subband within NOSB-FD symbols if a DL subband is indicated explicitly or implicitly for a NOSB-FD symbol.

In another embodiment, for Type 2 random access or 2-step RACH procedure in unpaired spectrum, if a UE is provided tdd-UL-DL-ConfigurationCommon, a PUSCH occasion is valid if all symbols of the PUSCH occasion satisfy one or more of the following factors (and/or some other factor that may be used in other embodiments)

- are within UL symbols or flexible symbols as indicated by tdd-UL-DL-ConfigurationCommon; or
- are within NOSB-FD symbols and the frequency resource of the PUSCH occasion is within UL subband of NOSB-FD.

Note that when frequency hopping is indicated for MsgA PUSCH transmission, the MsgA PUSCH occasion is valid when frequency resources for the first and second hop are within the UL subband of NOSB-FD.

In another option, a UE may not expect to be configured with a MsgA PUSCH occasion overlapping with a DL subband within NOSB-FD symbols if a DL subband is indicated explicitly or implicitly for a NOSB-FD symbol.

Figure 7:
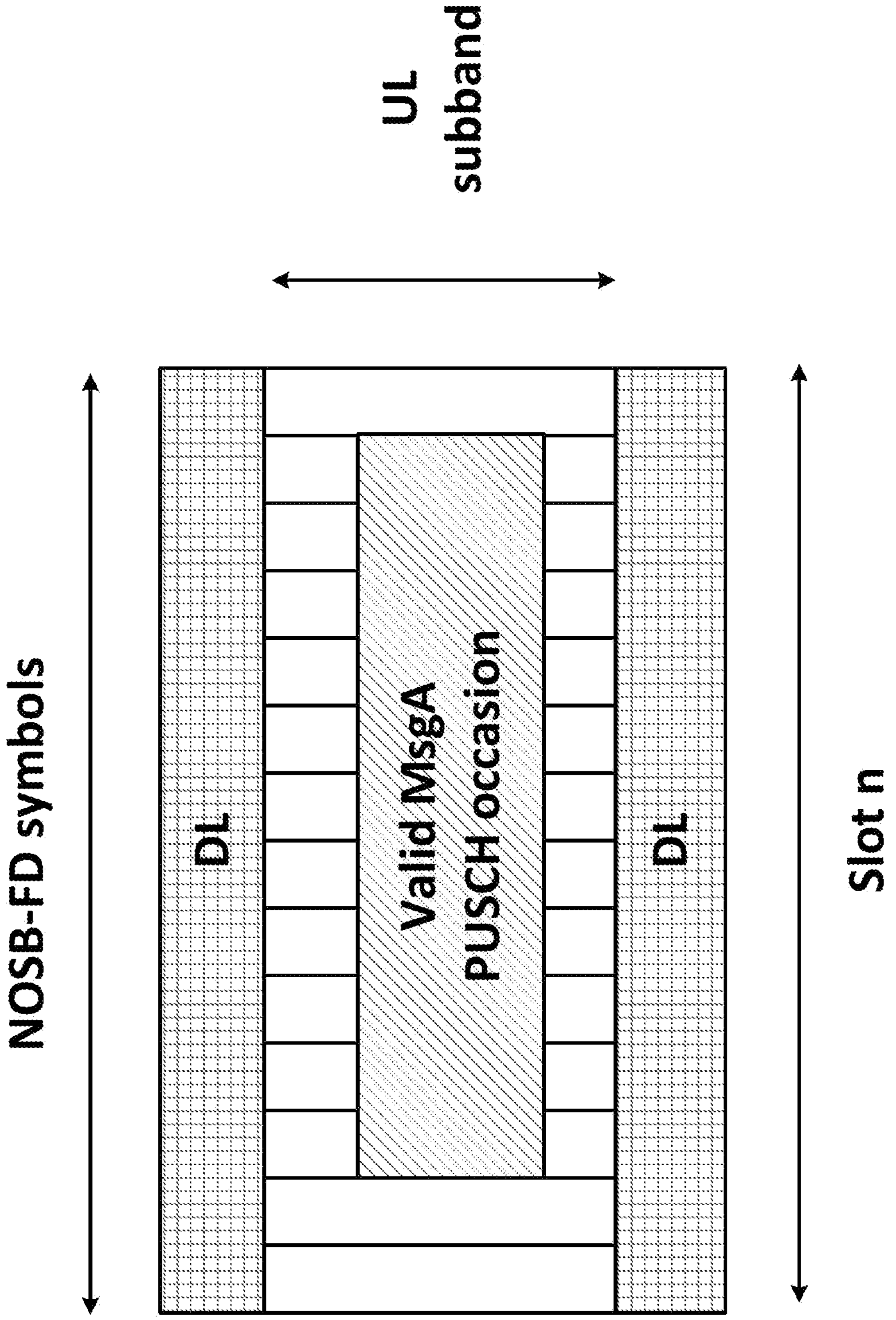
FIG. 7 illustrates an example of a valid MsgA PUSCH occasion for duplex operation, in accordance with various embodiments.

FIG. 7 illustrates one example of valid MsgA PUSCH occasion for duplex operation. In the example, as MsgA PUSCH occasion is within the NOSB-FD symbols and within the UL subband for NOSB-FD, the MsgA PUSCH occasion is a valid PUSCH occasion.

In another embodiment, for Type 2 random access or 2-step RACH procedure, for unpaired spectrum, if numerology for initial or active UL BWP is different from that for the UL subband for NOSB-FD operation, a PUSCH occasion is not valid if it overlaps with the NOSB-FD symbols In another embodiment, for configured grant PUSCH (CG-PUSCH) occasion for configured grant small data transmission (CG-SDT) operation, for unpaired spectrum, if a UE is provided tdd-UL-DL-ConfigurationCommon, a PUSCH occasion is valid if the PUSCH occasion satisfies one or more of the following conditions (and/or some other condition):

- is within UL symbols, or flexible symbols; and/or
- is within NOSB-FD symbols and the frequency resource of the PUSCH occasion is within UL subband of NOSB-FD.

Note that when frequency hopping is indicated for CG-PUSCH transmission for CG-SDT, the CG-PUSCH occasion is valid when frequency resources for the first and second hop are within the UL subband of NOSB-FD.

In another option, a UE does not expect to be configured with a CG-PUSCH occasion for CG-SDT operation that may overlap with DL subband within NOSB-FD symbols.

In another embodiment, for configured grant PUSCH (CG-PUSCH) occasion for configured grant small data transmission (CG-SDT) operation in unpaired spectrum, if numerology for initial or active UL BWP is different from that for the UL subband for NOSB-FD operation, a PUSCH occasion may not be valid if it overlaps with a NOSB-FD symbol.

In another embodiment, for Msg3 initial and retransmission, MsgA PUSCH transmission and CG-PUSCH transmission during CG-SDT operation, if time resource is within NOSB-FD symbols and the frequency resource is within UL subband of NOSB-FD, the frequency resource is determined in accordance with the UL subband of NOSB-FD.

In one option, for Msg3 transmission scheduled by random access response (RAR) UL grant, the frequency domain resource allocation is determined based on UL subband of NOSB-FD as follows:

The frequency domain resource allocation is by uplink resource allocation type 1 [6, TS 38.214]. For an UL subband size of $$N^{size}_{SB-FD}$$

RBs for NOSB-FD, a UE processes the frequency domain resource assignment field as follows:

if $$N^{size}_{SB-FD}$$

≤180, or for operation with shared spectrum channel access if $$N^{size}_{SB-FD}$$

≤90 truncate the frequency domain resource assignment field to its $$\lceil \log_2(N^{size}_{SB-FD} \cdot (N^{size}_{SB-FD}+1)/2) \rceil$$

least significant bits and interpret the truncated frequency resource assignment field as for the frequency resource assignment field in DCI format 0_0 as described in [5, TS 38.212]

else insert $$\lceil \log_2(N^{size}_{SB-FD} \cdot (N^{size}_{SB-FD}+1)/2) \rceil - 14$$

most significant bits, or for operation with shared spectrum channel access insert $$\lceil \log_2(N^{size}_{SB-FD} \cdot (N^{size}_{SB-FD}+1)/2) \rceil - 12$$

most significant bits, with value set to '0' after the $N_{UL,hop}$ bits to the frequency domain resource assignment field, where $N_{UL,hop}=0$ if the frequency hopping flag is set to '0' and $N_{UL,hop}$ is provided in Table 8.3-1 if the hopping flag bit is set to '1', and interpret the expanded frequency resource assignment field as for the frequency resource assignment field in DCI format 0_0 as described in [5, TS 38.212]

end if

In another option, for MsgA PUSCH transmission, the frequency domain resource allocation is determined based on UL subband of NOSB-FD as follows:

A UE determines a first interlace or first RB for a first PUSCH occasion in an active UL subband of NOSB-FD respectively from interlaceIndexFirstPO-MsgA-PUSCH or from frequencyStartMsgA-PUSCH that provides an offset, in number of RBs in the active UL subband of NOSB-FD, from a first RB of the active UL subband of NOSB-FD.

In another embodiment, when frequency hopping is indicated for MsgA PUSCH transmission and Msg3 initial transmission and retransmission, if MsgA PUSCH transmission and Msg3 initial transmission and retransmission is within NOSB-FD symbols, the frequency offset for the frequency hopping is determined based on BW for UL subband for NOSB-FD.

In one option, frequency offset for second hop of PUSCH transmission with frequency hopping scheduled by RAR UL grant or of Msg3 PUSCH retransmission or MsgA PUSCH transmission is determined based on BW for UL subband for NOSB-FD as follows, where $$N^{size}_{SB-FD}$$

is the UL subband size for NOSB-FD.

TABLE 8.3-1

Frequency offset for second hop of PUSCH transmission with frequency hopping scheduled byu RAT UL grant or of Msg3 PUSCH retransmission

| Number of PRBs in UL subband of NOSB-FD | Value of $N_{UL,\ hop}$ Hopping Bits | Frequency offset for $2^{nd}$ hop |
|---|---|---|
| $N_{SB-FD}^{size} < 50$ | 0 | $\lfloor N_{SB-FD}^{size}/2 \rfloor$ |
| | 1 | $\lfloor N_{SB-FD}^{size}/4 \rfloor$ |
| $N_{SB-FD}^{size} \geq 50$ | 00 | $\lfloor N_{SB-FD}^{size}/2 \rfloor$ |
| | 01 | $\lfloor N_{SB-FD}^{size}/4 \rfloor$ |
| | 10 | $-\lfloor N_{SB-FD}^{size}/4 \rfloor$ |
| | 11 | Reserved |

Note that for the above embodiments, it is assumed same numerology is configured for initial or active UL BWP and UL subband for NOSB-FD. In case when different numerology for initial or active UL BWP and UL subband for NOSB-FD is configured, Msg3 with and without repetition, including initial and retransmission cannot be transmitted in the NOSB-FD symbols.

Note that for the above embodiments, NOSB-FD configuration including UL subband configuration may be configured by system information block1 (SIB1) or RMSI or dedicated RRC signaling.

As another embodiment, NOSB-FD symbols are not identified or used for UL transmissions until RRC configuration setup. Accordingly, SDT or 2-step or 4-step RACH as part of initial access may not utilize knowledge of NOSB-FD symbol configurations.

In another embodiment, a UE may not expect to be provided with an UL transmission occasion such that at least one symbol of the transmission occasion overlaps with an UL symbol or flexible symbol and at least another symbol of the transmission occasion overlaps with an NOSB-FD symbol if the active UL BWP and the UL subband in a NOSB-FD symbol may satisfy one or more of the following conditions (and/or some other condition in other embodiments):

- the active UL BWP and UL subband in NOSB-FD symbol have different location (e.g., starting PRB and/or center frequency) and/or BW; and/or
- the UE is expected to use different values of nominal bandwidth (BW) and/or center frequency for transmitter side filtering in an UL symbol (that corresponds to location and BW of active UL BWP) and in an NOSB-FD symbol (that corresponds to location and BW of the UL subband in NOSB-FD symbol).

In an example of the embodiment, the UL channel or signal may include a repetition of PUCCH, a repetition of a PUSCH, a PRACH transmission.

In another embodiment, a UE may not be expected to transmit an UL channel or signal if the UL channel or signal has at least one symbol that overlaps with an UL symbol or flexible symbol and has another symbol that overlaps with an NOSB-FD symbol if the active UL BWP and the UL subband in a NOSB-FD symbol may satisfy one or more of the following conditions (and/or some other condition in other embodiments):

- the active UL BWP and UL subband in NOSB-FD symbol have different location (e.g., starting PRB and/or center frequency) and/or BW; and/or
- the UE is expected to use different values of nominal bandwidth (BW) and/or center frequency for transmitter side filtering in an UL symbol (that corresponds to location and BW of active UL BWP) and in an NOSB-FD symbol (that corresponds to location and BW of the UL subband in NOSB-FD symbol).

In an example of the embodiment, the UL channel or signal may include a repetition of PUCCH, a repetition of a PUSCH, or TBoMS, a PRACH transmission.

In another example of the embodiment, for the case of multi-symbol SRS transmissions that may include both UL or flexible and NOSB-FD symbols, the UE may be expected to transmit the first set of SRS symbols in UL/flexible or NOSB-FD symbols and drop the remaining SRS symbols in NOSB-FD or UL/flexible symbols respectively.

In another example of the embodiment, for PUSCH repetition type B, a nominal PUSCH repetition that includes both UL and NOSB-FD symbols may be segmented at the boundary of UL and NOSB-FD symbols if the active UL BWP and the UL subband in a NOSB-FD symbol may satisfy one or more of the following conditions (and/or some other condition in other embodiments):

- the active UL BWP and UL subband in NOSB-FD symbol have different location (e.g., starting PRB and/or center frequency) and/or BW; and/or
- the UE is expected to use different values of nominal bandwidth (BW) and/or center frequency for transmitter side filtering in an UL symbol (that corresponds to location and BW of active UL BWP) and in an NOSB-FD symbol (that corresponds to location and BW of the UL subband in NOSB-FD symbol).

DMRS Bundling for Multi-Slot PUSCH and PUCCH Repetitions for Full Duplex Operation In Rel-17, Demodulation Reference Signal (DMRS) bundling for multi-slot PUSCH transmission including PUSCH repetition type A and type B, TBoMS, and PUCCH repetitions were specified, with the motivation of improving channel estimation and overall decoding performance. Further, a list of events which cause power consistency and phase continuity not to be maintained were defined in Section 6.1.7 in TS38.214 [1]. Depending on UE capability and whether the event is triggered by higher layer signaling such as DCI or medium access control-control element (MAC-CE), UE may or may not restart the DMRS bundling during a nominal time domain window.

Embodiment of DMRS bundling for multi-slot PUSCH and PUCCH repetitions for full duplex operation are provided as follows:

In one embodiment, the event which causes power consistency and phase continuity not to be maintained may include the case for multi-slot PUSCH and PUCCH repetitions, UE switches from NOSB-FD symbols to regular symbols (or non-NOSB-FD symbol) or vice versa.

In another option, the event which causes power consistency and phase continuity not to be maintained may include the case for multi-slot PUSCH and PUCCH repetitions, UE switches from UL subband in NOSB-FD symbols or configured UL BWP for NOSB-FD symbols to active UL BWP, or vice versa. Note that for configured UL BWP for NOSB-FD symbols, UE may be separately configured by dedicated RRC signalling a UL BWP within a NOSB-FD symbols, which can be different from the active UL BWP for uplink transmission.

In another option, the event which causes power consistency and phase continuity not to be maintained may include the case for multi-slot PUSCH and PUCCH repetitions, wherein any two consecutive PUCCH/PUSCH transmissions of PUCCH/PUSCH repetition are mapped to different frequency resources. For example, frequency resource for PUSCH repetitions in NOSB-FD and in non-NOSB-FD symbols can be different.

In another option, the event which causes power consistency and phase continuity not to be maintained may include the case for multi-slot PUSCH and PUCCH repetitions, UE switches from UL subband in NOSB-FD symbols or configured UL BWP for NOSB-FD symbols to active UL BWP, or vice versa, where different set of power control parameters are configured for UL subband in NOSB-FD symbols or configured UL BWP for NOSB-FD symbols and active UL BWP. Note that this may apply for the case when same frequency resource is allocated for NOSB-FD symbols or configured UL BWP for NOSB-FD symbols and active UL BWP.

In another option, the event which causes power consistency and phase continuity not to be maintained may include the case for multi-slot PUSCH and PUCCH repetitions, wherein any two consecutive PUCCH/PUSCH transmissions of PUCCH/PUSCH repetition are with different power control parameters. Note that this may apply for the case when same frequency resource is allocated for NOSB-FD symbols and non-NOSB-FD symbols.

In one embodiment, the event which causes power consistency and phase continuity not to be maintained may include the case for multi-slot PUSCH and PUCCH repetitions, if a dropping or cancellation of a PUSCH/PUCCH transmission happens due to dynamic switch between NOSB-FD symbols and non-NOSB-FD symbols. For example, if a PUSCH includes NOSB-FD symbols configured in a flexible symbol which is dynamically switched to full DL symbol, the PUSCH is dropped.

In another embodiment, the event which causes power consistency and phase continuity not to be maintained may include the case for multi-slot PUSCH and PUCCH repetitions, uplink timing adjustment in response to different UL timing, e.g., a timing advance offset $N_{TA,offset}$ and/or a timing advance command.

In another embodiment, the aforementioned events may be considered as semi-static event, regardless of whether the NOSB-FD symbol is indicated by DCI or MAC-CE. In this case, UE is mandatory to support restarting DM-RS bundling within a nominal time domain window.

Note that this may apply for the PUSCH transmissions of PUSCH repetition type A scheduled by DCI format 0_1 or 0_2, or PUSCH repetition Type A with a configured grant, or PUSCH repetition type B or TB processing over multiple slots, or PUCCH transmissions of PUCCH repetition.

Systems and Implementations

FIGS. 10-13 illustrate various systems, devices, and components that may implement aspects of disclosed embodiments.

Figure 10:
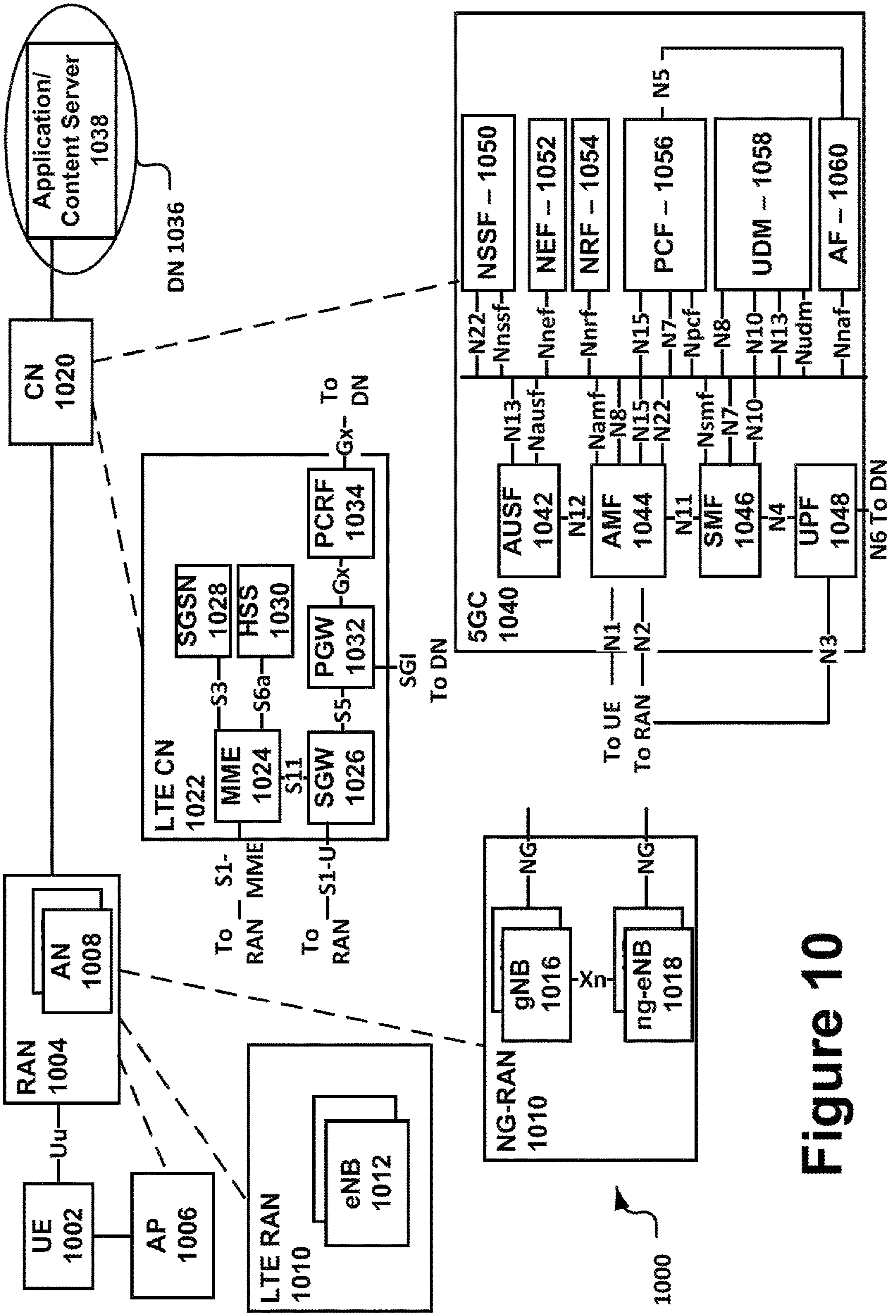
FIG. 10 schematically illustrates an example wireless network in accordance with various embodiments.

FIG. 10 illustrates a network 1000 in accordance with various embodiments. The network 1000 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1000 may include a UE 1002, which may include any mobile or non-mobile computing device designed to communicate with a RAN 1004 via an over-the-air connection. The UE 1002 may be communicatively coupled with the RAN 1004 by a Uu interface. The UE 1002 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1000 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1002 may additionally communicate with an AP 1006 via an over-the-air connection. The AP 1006 may manage a WLAN connection, which may serve to offload some/all network traffic from the RAN 1004. The connection between the UE 1002 and the AP 1006 may be consistent with any IEEE 802.11 protocol, wherein the AP 1006 could be a wireless fidelity (Wi-Fi®) router. In some embodiments, the UE 1002, RAN 1004, and AP 1006 may utilize cellular-WLAN aggregation (for example, LWA/LWIP). Cellular-WLAN aggregation may involve the UE 1002 being configured by the RAN 1004 to utilize both cellular radio resources and WLAN resources.

The RAN 1004 may include one or more access nodes, for example, AN 1008. AN 1008 may terminate air-interface protocols for the UE 1002 by providing access stratum protocols including RRC, PDCP, RLC, MAC, and L1 protocols. In this manner, the AN 1008 may enable data/voice connectivity between CN 1020 and the UE 1002. In some embodiments, the AN 1008 may be implemented in a discrete device or as one or more software entities running on server computers as part of, for example, a virtual network, which may be referred to as a CRAN or virtual baseband unit pool. The AN 1008 be referred to as a BS, gNB, RAN node, eNB, ng-eNB, NodeB, RSU, TRxP, TRP, etc. The AN 1008 may be a macrocell base station or a low power base station for providing femtocells, picocells or other like cells having smaller coverage areas, smaller user capacity, or higher bandwidth compared to macrocells.

In embodiments in which the RAN 1004 includes a plurality of ANs, they may be coupled with one another via an X2 interface (if the RAN 1004 is an LTE RAN) or an Xn interface (if the RAN 1004 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1004 may each manage one or more cells, cell groups, component carriers, etc. to provide the UE 1002 with an air interface for network access. The UE 1002 may be simultaneously connected with a plurality of cells provided by the same or different ANs of the RAN 1004. For example, the UE 1002 and RAN 1004 may use carrier aggregation to allow the UE 1002 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1004 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1002 or AN 1008 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1004 may be an LTE RAN 1010 with eNBs, for example, eNB 1012. The LTE RAN 1010 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1004 may be an NG-RAN 1014 with gNBs, for example, gNB 1016, or ng-eNBs, for example, ng-eNB 1018. The gNB 1016 may connect with 5G-enabled UEs using a 5G NR interface. The gNB 1016 may connect with a 5G core through an NG interface, which may include an N2 interface or an N3 interface. The ng-eNB 1018 may also connect with the 5G core through an NG interface, but may connect with a UE via an LTE air interface. The gNB 1016 and the ng-eNB 1018 may connect with each other over an Xn interface.

In some embodiments, the NG interface may be split into two parts, an NG user plane (NG-U) interface, which carries traffic data between the nodes of the NG-RAN 1014 and a UPF 1048 (e.g., N3 interface), and an NG control plane (NG-C) interface, which is a signaling interface between the nodes of the NG-RAN 1014 and an AMF 1044 (e.g., N2 interface).

The NG-RAN 1014 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1002 can be configured with multiple BWPs where each BWP configuration has a different SCS. When a BWP change is indicated to the UE 1002, the SCS of the transmission is changed as well. Another use case example of BWP is related to power saving. In particular, multiple BWPs can be configured for the UE 1002 with different amount of frequency resources (for example, PRBs) to support data transmission under different traffic loading scenarios. A BWP containing a smaller number of PRBs can be used for data transmission with small traffic load while allowing power saving at the UE 1002 and in some cases at the gNB 1016. A BWP containing a larger number of PRBs can be used for scenarios with higher traffic load.

The RAN 1004 is communicatively coupled to CN 1020 that includes network elements to provide various functions to support data and telecommunications services to customers/subscribers (for example, users of UE 1002). The components of the CN 1020 may be implemented in one physical node or separate physical nodes. In some embodiments, NFV may be utilized to virtualize any or all of the functions provided by the network elements of the CN 1020 onto physical compute/storage resources in servers, switches, etc. A logical instantiation of the CN 1020 may be referred to as a network slice, and a logical instantiation of a portion of the CN 1020 may be referred to as a network sub-slice.

In some embodiments, the CN 1020 may be an LTE CN 1022, which may also be referred to as an EPC. The LTE CN 1022 may include MME 1024, SGW 1026, SGSN 1028, HSS 1030, PGW 1032, and PCRF 1034 coupled with one another over interfaces (or "reference points") as shown. Functions of the elements of the LTE CN 1022 may be briefly introduced as follows.

The MME 1024 may implement mobility management functions to track a current location of the UE 1002 to facilitate paging, bearer activation/deactivation, handovers, gateway selection, authentication, etc.

The SGW 1026 may terminate an Si interface toward the RAN and route data packets between the RAN and the LTE CN 1022. The SGW 1026 may be a local mobility anchor point for inter-RAN node handovers and also may provide an anchor for inter-3GPP mobility. Other responsibilities may include lawful intercept, charging, and some policy enforcement.

The SGSN 1028 may track a location of the UE 1002 and perform security functions and access control. In addition, the SGSN 1028 may perform inter-EPC node signaling for mobility between different RAT networks; PDN and S-GW selection as specified by MME 1024; MME selection for handovers; etc. The S3 reference point between the MME 1024 and the SGSN 1028 may enable user and bearer information exchange for inter-3GPP access network mobility in idle/active states.

The HSS 1030 may include a database for network users, including subscription-related information to support the network entities' handling of communication sessions. The HSS 1030 can provide support for routing/roaming, authentication, authorization, naming/addressing resolution, location dependencies, etc. An S6a reference point between the HSS 1030 and the MME 1024 may enable transfer of subscription and authentication data for authenticating/authorizing user access to the LTE CN 1020.

The PGW 1032 may terminate an SGi interface toward a data network (DN) 1036 that may include an application/content server 1038. The PGW 1032 may route data packets between the LTE CN 1022 and the data network 1036. The PGW 1032 may be coupled with the SGW 1026 by an S5 reference point to facilitate user plane tunneling and tunnel management. The PGW 1032 may further include a node for policy enforcement and charging data collection (for example, PCEF). Additionally, the SGi reference point between the PGW 1032 and the data network 1036 may be an operator external public, a private PDN, or an intra-operator packet data network, for example, for provision of IMS services. The PGW 1032 may be coupled with a PCRF 1034 via a Gx reference point.

The PCRF 1034 is the policy and charging control element of the LTE CN 1022. The PCRF 1034 may be communicatively coupled to the app/content server 1038 to determine appropriate QoS and charging parameters for service flows. The PCRF 1032 may provision associated rules into a PCEF (via Gx reference point) with appropriate TFT and QCI.

In some embodiments, the CN 1020 may be a 5GC 1040. The 5GC 1040 may include an AUSF 1042, AMF 1044, SMF 1046, UPF 1048, NSSF 1050, NEF 1052, NRF 1054, PCF 1056, UDM 1058, and AF 1060 coupled with one another over interfaces (or "reference points") as shown. Functions of the elements of the 5GC 1040 may be briefly introduced as follows.

The AUSF 1042 may store data for authentication of UE 1002 and handle authentication-related functionality. The AUSF 1042 may facilitate a common authentication framework for various access types. In addition to communicating with other elements of the 5GC 1040 over reference points as shown, the AUSF 1042 may exhibit an Nausf service-based interface.

The AMF 1044 may allow other functions of the 5GC 1040 to communicate with the UE 1002 and the RAN 1004 and to subscribe to notifications about mobility events with respect to the UE 1002. The AMF 1044 may be responsible for registration management (for example, for registering UE 1002), connection management, reachability management, mobility management, lawful interception of AMF-related events, and access authentication and authorization. The AMF 1044 may provide transport for SM messages between the UE 1002 and the SMF 1046, and act as a transparent proxy for routing SM messages. AMF 1044 may also provide transport for SMS messages between UE 1002 and an SMSF. AMF 1044 may interact with the AUSF 1042 and the UE 1002 to perform various security anchor and context management functions. Furthermore, AMF 1044 may be a termination point of a RAN CP interface, which may include or be an N2 reference point between the RAN 1004 and the AMF 1044; and the AMF 1044 may be a termination point of NAS (N1) signaling, and perform NAS ciphering and integrity protection. AMF 1044 may also support NAS signaling with the UE 1002 over an N3 IWF interface.

The SMF 1046 may be responsible for SM (for example, session establishment, tunnel management between UPF 1048 and AN 1008); UE IP address allocation and management (including optional authorization); selection and control of UP function; configuring traffic steering at UPF 1048 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1044 over N2 to AN 1008; and determining SSC mode of a session. SM may refer to management of a PDU session, and a PDU session or "session" may refer to a PDU connectivity service that provides or enables the exchange of PDUs between the UE 1002 and the data network 1036.

The UPF 1048 may act as an anchor point for intra-RAT and inter-RAT mobility, an external PDU session point of interconnect to data network 1036, and a branching point to support multi-homed PDU session. The UPF 1048 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1048 may include an uplink classifier to support routing traffic flows to a data network.

The NSSF 1050 may select a set of network slice instances serving the UE 1002. The NSSF 1050 may also determine allowed NSSAI and the mapping to the subscribed S-NSSAIs, if needed. The NSSF 1050 may also determine the AMF set to be used to serve the UE 1002, or a list of candidate AMFs based on a suitable configuration and possibly by querying the NRF 1054. The selection of a set of network slice instances for the UE 1002 may be triggered by the AMF 1044 with which the UE 1002 is registered by interacting with the NSSF 1050, which may lead to a change of AMF. The NSSF 1050 may interact with the AMF 1044 via an N22 reference point; and may communicate with another NSSF in a visited network via an N31 reference point (not shown). Additionally, the NSSF 1050 may exhibit an Nnssf service-based interface.

The NEF 1052 may securely expose services and capabilities provided by 3GPP network functions for third party, internal exposure/re-exposure, AFs (e.g., AF 1060), edge computing or fog computing systems, etc. In such embodiments, the NEF 1052 may authenticate, authorize, or throttle the AFs. NEF 1052 may also translate information exchanged with the AF 1060 and information exchanged with internal network functions. For example, the NEF 1052 may translate between an AF-Service-Identifier and an internal 5GC information. NEF 1052 may also receive information from other NFs based on exposed capabilities of other NFs. This information may be stored at the NEF 1052 as structured data, or at a data storage NF using standardized interfaces. The stored information can then be re-exposed by the NEF 1052 to other NFs and AFs, or used for other purposes such as analytics. Additionally, the NEF 1052 may exhibit an Nnef service-based interface.

The NRF 1054 may support service discovery functions, receive NF discovery requests from NF instances, and provide the information of the discovered NF instances to the NF instances. NRF 1054 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1054 may exhibit the Nnrf service-based interface.

The PCF 1056 may provide policy rules to control plane functions to enforce them, and may also support unified policy framework to govern network behavior. The PCF 1056 may also implement a front end to access subscription information relevant for policy decisions in a UDR of the UDM 1058. In addition to communicating with functions over reference points as shown, the PCF 1056 exhibit an Npcf service-based interface.

The UDM 1058 may handle subscription-related information to support the network entities' handling of communication sessions, and may store subscription data of UE 1002. For example, subscription data may be communicated via an N8 reference point between the UDM 1058 and the AMF 1044. The UDM 1058 may include two parts, an application front end and a UDR. The UDR may store subscription data and policy data for the UDM 1058 and the PCF 1056, and/or structured data for exposure and application data (including PFDs for application detection, application request information for multiple UEs 1002) for the NEF 1052. The Nudr service-based interface may be exhibited by the UDR 221 to allow the UDM 1058, PCF 1056, and NEF 1052 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1058 may exhibit the Nudm service-based interface.

The AF 1060 may provide application influence on traffic routing, provide access to NEF, and interact with the policy framework for policy control.

In some embodiments, the 5GC 1040 may enable edge computing by selecting operator/3rd party services to be geographically close to a point that the UE 1002 is attached to the network. This may reduce latency and load on the network. To provide edge-computing implementations, the 5GC 1040 may select a UPF 1048 close to the UE 1002 and execute traffic steering from the UPF 1048 to data network 1036 via the N6 interface. This may be based on the UE subscription data, UE location, and information provided by the AF 1060. In this way, the AF 1060 may influence UPF (re)selection and traffic routing. Based on operator deployment, when AF 1060 is considered to be a trusted entity, the network operator may permit AF 1060 to interact directly with relevant NFs. Additionally, the AF 1060 may exhibit an Naf service-based interface.

The data network 1036 may represent various network operator services, Internet access, or third party services that may be provided by one or more servers including, for example, application/content server 1038.

Figure 11:
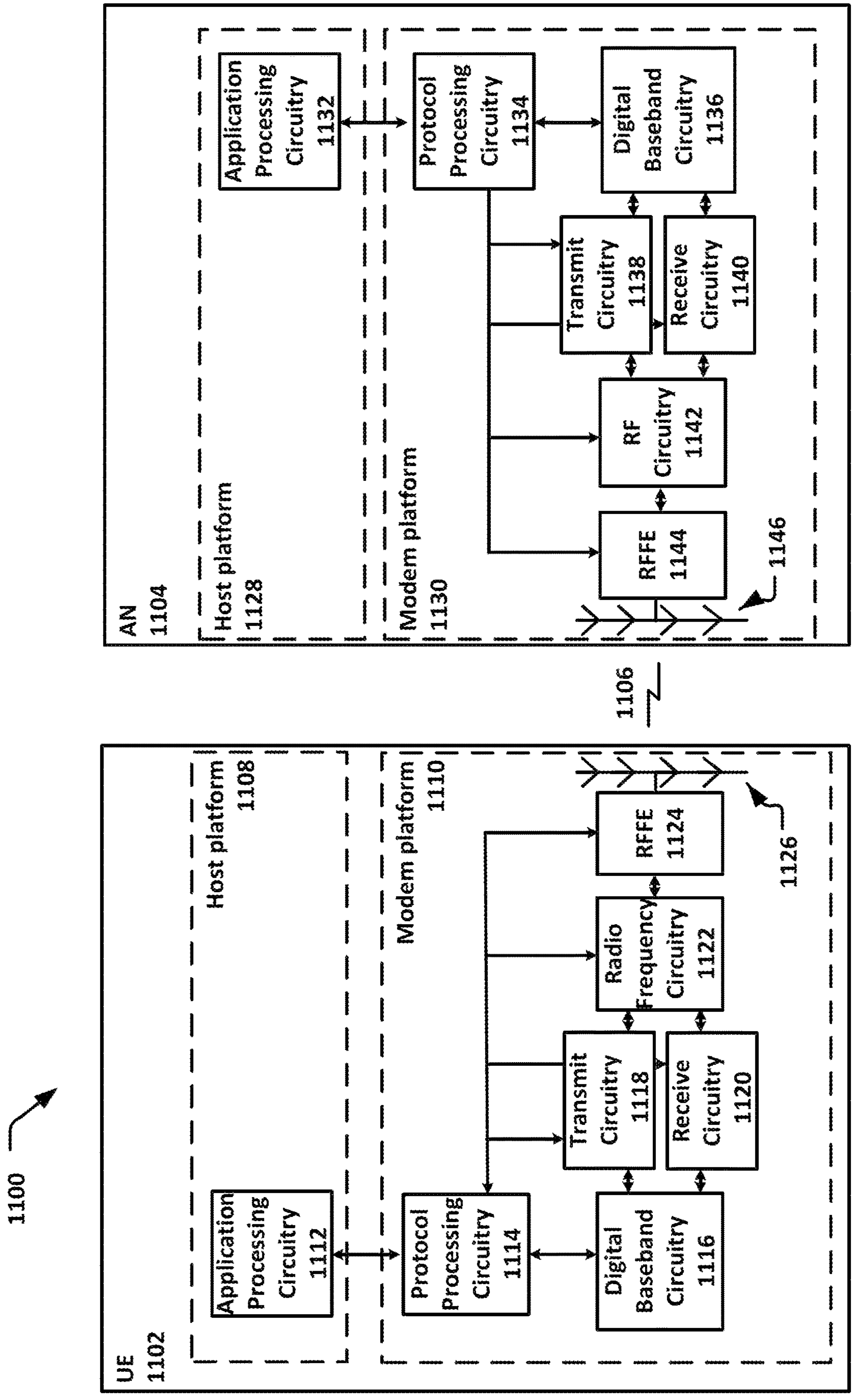
FIG. 11 schematically illustrates example components of a wireless network in accordance with various embodiments.

FIG. 11 schematically illustrates a wireless network 1100 in accordance with various embodiments. The wireless network 1100 may include a UE 1102 in wireless communication with an AN 1104. The UE 1102 and AN 1104 may be similar to, and substantially interchangeable with, like-named components described elsewhere herein.

The UE 1102 may be communicatively coupled with the AN 1104 via connection 1106. The connection 1106 is illustrated as an air interface to enable communicative coupling, and can be consistent with cellular communications protocols such as an LTE protocol or a 5G NR protocol operating at mmWave or sub-6 GHz frequencies.

The UE 1102 may include a host platform 1108 coupled with a modem platform 1110. The host platform 1108 may include application processing circuitry 1112, which may be coupled with protocol processing circuitry 1114 of the modem platform 1110. The application processing circuitry 1112 may run various applications for the UE 1102 that source/sink application data. The application processing circuitry 1112 may further implement one or more layer operations to transmit/receive application data to/from a data network. These layer operations may include transport (for example UDP) and Internet (for example, IP) operations The protocol processing circuitry 1114 may implement one or more of layer operations to facilitate transmission or reception of data over the connection 1106. The layer operations implemented by the protocol processing circuitry 1114 may include, for example, MAC, RLC, PDCP, RRC and NAS operations.

The modem platform 1110 may further include digital baseband circuitry 1116 that may implement one or more layer operations that are "below" layer operations performed by the protocol processing circuitry 1114 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1110 may further include transmit circuitry 1118, receive circuitry 1120, RF circuitry 1122, and RF front end (RFFE) 1124, which may include or connect to one or more antenna panels 1126. Briefly, the transmit circuitry 1118 may include a digital-to-analog converter, mixer, intermediate frequency (IF) components, etc.; the receive circuitry 1120 may include an analog-to-digital converter, mixer, IF components, etc.; the RF circuitry 1122 may include a low-noise amplifier, a power amplifier, power tracking components, etc.; RFFE 1124 may include filters (for example, surface/bulk acoustic wave filters), switches, antenna tuners, beamforming components (for example, phase-array antenna components), etc. The selection and arrangement of the components of the transmit circuitry 1118, receive circuitry 1120, RF circuitry 1122, RFFE 1124, and antenna panels 1126 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1114 may include one or more instances of control circuitry (not shown) to provide control functions for the transmit/receive components.

A UE reception may be established by and via the antenna panels 1126, RFFE 1124, RF circuitry 1122, receive circuitry 1120, digital baseband circuitry 1116, and protocol processing circuitry 1114. In some embodiments, the antenna panels 1126 may receive a transmission from the AN 1104 by receive-beamforming signals received by a plurality of antennas/antenna elements of the one or more antenna panels 1126.

A UE transmission may be established by and via the protocol processing circuitry 1114, digital baseband circuitry 1116, transmit circuitry 1118, RF circuitry 1122, RFFE 1124, and antenna panels 1126. In some embodiments, the transmit components of the UE 1104 may apply a spatial filter to the data to be transmitted to form a transmit beam emitted by the antenna elements of the antenna panels 1126.

Similar to the UE 1102, the AN 1104 may include a host platform 1128 coupled with a modem platform 1130. The host platform 1128 may include application processing circuitry 1132 coupled with protocol processing circuitry 1134 of the modem platform 1130. The modem platform may further include digital baseband circuitry 1136, transmit circuitry 1138, receive circuitry 1140, RF circuitry 1142, RFFE circuitry 1144, and antenna panels 1146. The components of the AN 1104 may be similar to and substantially interchangeable with like-named components of the UE 1102. In addition to performing data transmission/reception as described above, the components of the AN 1108 may perform various logical functions that include, for example, RNC functions such as radio bearer management, uplink and downlink dynamic radio resource management, and data packet scheduling.

Figure 12:
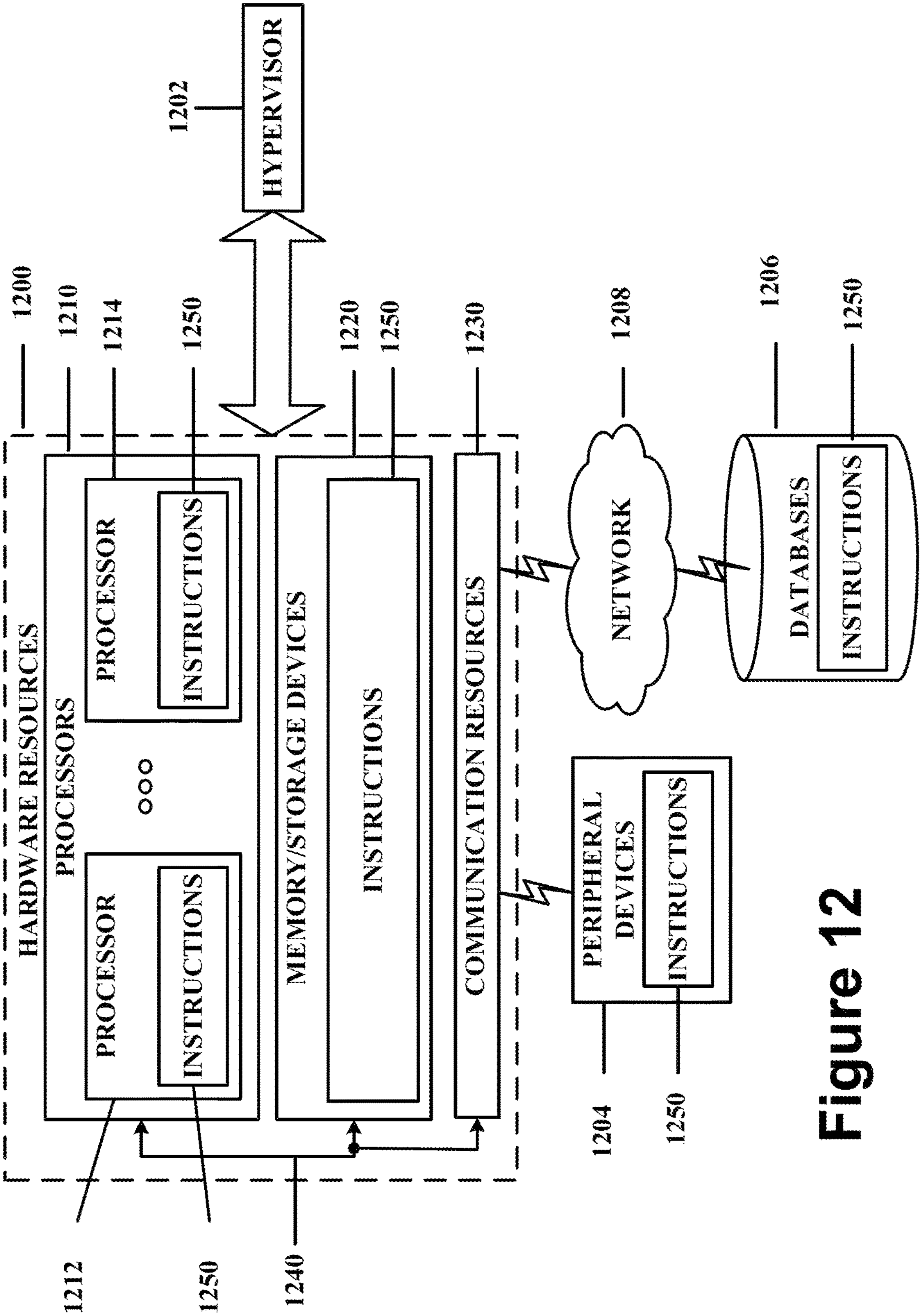
FIG. 12 is a block diagram illustrating example components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240 or other interface circuitry. For embodiments where node virtualization (e.g., NFV) is utilized, a hypervisor 1202 may be executed to provide an execution environment for one or more network slices/sub-slices to utilize the hardware resources 1200.

The processors 1210 may include, for example, a processor 1212 and a processor 1214. The processors 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface controllers, components, or other suitable devices to communicate with one or more peripheral devices 1204 or one or more databases 1206 or other network elements via a network 1208. For example, the communication resources 1230 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Figure 13:
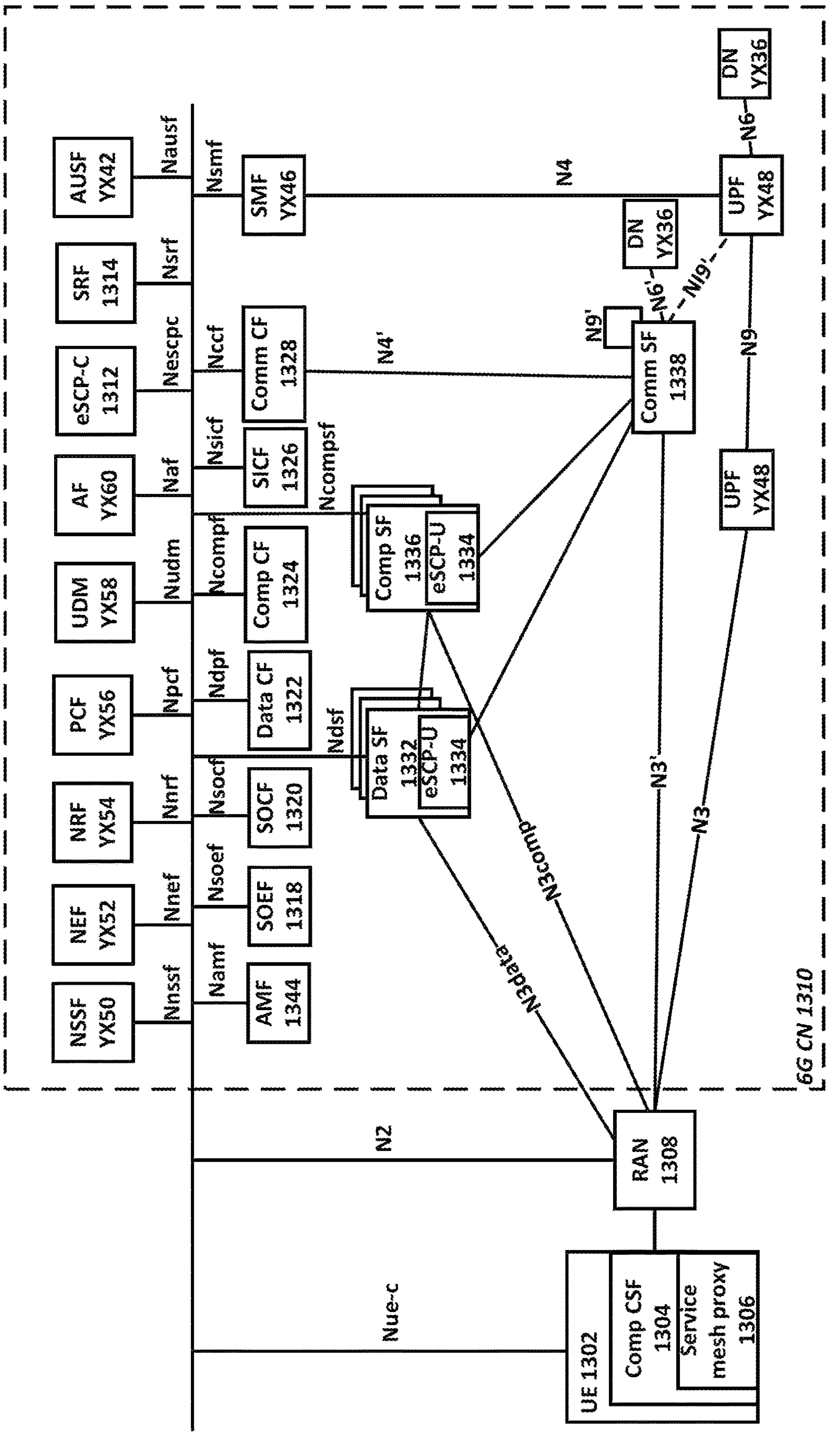
FIG. 13 illustrates an alternative example wireless network, in accordance with various embodiments.

FIG. 13 illustrates a network 1300 in accordance with various embodiments. The network 1300 may operate in a matter consistent with 3GPP technical specifications or technical reports for 6G systems. In some embodiments, the network 1300 may operate concurrently with network 1000. For example, in some embodiments, the network 1300 may share one or more frequency or bandwidth resources with network 1000. As one specific example, a UE (e.g., UE 1302) may be configured to operate in both network 1300 and network 1000. Such configuration may be based on a UE including circuitry configured for communication with frequency and bandwidth resources of both networks 1000 and 1300. In general, several elements of network 1300 may share one or more characteristics with elements of network 1000. For the sake of brevity and clarity, such elements may not be repeated in the description of network 1300.

The network 1300 may include a UE 1302, which may include any mobile or non-mobile computing device designed to communicate with a RAN 1308 via an over-the-air connection. The UE 1302 may be similar to, for example, UE 1002. The UE 1302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 13, in some embodiments the network 1300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 13, the UE 1302 may be communicatively coupled with an AP such as AP 1006 as described with respect to FIG. 10. Additionally, although not specifically shown in FIG. 13, in some embodiments the RAN 1308 may include one or more ANss such as AN 1008 as described with respect to FIG. 10. The RAN 1308 and/or the AN of the RAN 1308 may be referred to as a base station (BS), a RAN node, or using some other term or name.

The UE 1302 and the RAN 1308 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 1308 may allow for communication between the UE 1302 and a 6G core network (CN) 1310. Specifically, the RAN 1308 may facilitate the transmission and reception of data between the UE 1302 and the 6G CN 1310. The 6G CN 1310 may include various functions such as NSSF 1050, NEF 1052, NRF 1054, PCF 1056, UDM 1058, AF 1060, SMF 1046, and AUSF 1042. The 6G CN 1310 may additional include UPF 1048 and DN 1036 as shown in FIG. 13.

Additionally, the RAN 1308 may include various additional functions that are in addition to, or alternative to, functions of a legacy cellular network such as a 4G or 5G network. Two such functions may include a Compute Control Function (Comp CF) 1324 and a Compute Service Function (Comp SF) 1336. The Comp CF 1324 and the Comp SF 1336 may be parts or functions of the Computing Service Plane. Comp CF 1324 may be a control plane function that provides functionalities such as management of the Comp SF 1336, computing task context generation and management (e.g., create, read, modify, delete), interaction with the underlaying computing infrastructure for computing resource management, etc. Comp SF 1336 may be a user plane function that serves as the gateway to interface computing service users (such as UE 1302) and computing nodes behind a Comp SF instance. Some functionalities of the Comp SF 1336 may include: parse computing service data received from users to compute tasks executable by computing nodes; hold service mesh ingress gateway or service API gateway; service and charging policies enforcement; performance monitoring and telemetry collection, etc. In some embodiments, a Comp SF 1336 instance may serve as the user plane gateway for a cluster of computing nodes. A Comp CF 1324 instance may control one or more Comp SF 1336 instances.

Two other such functions may include a Communication Control Function (Comm CF) 1328 and a Communication Service Function (Comm SF) 1338, which may be parts of the Communication Service Plane. The Comm CF 1328 may be the control plane function for managing the Comm SF 1338, communication sessions creation/configuration/releasing, and managing communication session context. The Comm SF 1338 may be a user plane function for data transport. Comm CF 1328 and Comm SF 1338 may be considered as upgrades of SMF 1046 and UPF 1048, which were described with respect to a 5G system in FIG. 10. The upgrades provided by the Comm CF 1328 and the Comm SF 1338 may enable service-aware transport. For legacy (e.g., 4G or 5G) data transport, SMF 1046 and UPF 1048 may still be used.

Two other such functions may include a Data Control Function (Data CF) 1322 and Data Service Function (Data SF) 1332 may be parts of the Data Service Plane. Data CF 1322 may be a control plane function and provides functionalities such as Data SF 1332 management, Data service creation/configuration/releasing, Data service context management, etc. Data SF 1332 may be a user plane function and serve as the gateway between data service users (such as UE 1302 and the various functions of the 6G CN 1310) and data service endpoints behind the gateway. Specific functionalities may include include: parse data service user data and forward to corresponding data service endpoints, generate charging data, report data service status.

Another such function may be the Service Orchestration and Chaining Function (SOCF) 1320, which may discover, orchestrate and chain up communication/computing/data services provided by functions in the network. Upon receiving service requests from users, SOCF 1320 may interact with one or more of Comp CF 1324, Comm CF 1328, and Data CF 1322 to identify Comp SF 1336, Comm SF 1338, and Data SF 1332 instances, configure service resources, and generate the service chain, which could contain multiple Comp SF 1336, Comm SF 1338, and Data SF 1332 instances and their associated computing endpoints. Workload processing and data movement may then be conducted within the generated service chain. The SOCF 1320 may also responsible for maintaining, updating, and releasing a created service chain.

Another such function may be the service registration function (SRF) 1314, which may act as a registry for system services provided in the user plane such as services provided by service endpoints behind Comp SF 1336 and Data SF 1332 gateways and services provided by the UE 1302. The SRF 1314 may be considered a counterpart of NRF 1054, which may act as the registry for network functions.

Other such functions may include an evolved service communication proxy (eSCP) and service infrastructure control function (SICF) 1326, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 1312 and eSCP-U 1334, for control plane service communication proxy and user plane service communication proxy, respectively. The SICF 1326 may control and configure eCSP instances in terms of service traffic routing policies, access rules, load balancing configurations, performance monitoring, etc.

Another such function is the AMF 1344. The AMF 1344 may be similar to 1044, but with additional functionality. Specifically, the AMF 1344 may include potential functional repartition, such as move the message forwarding functionality from the AMF 1344 to the RAN 1308.

Another such function is the service orchestration exposure function (SOEF) 1318. The SOEF may be configured to expose service orchestration and chaining services to external users such as applications.

The UE 1302 may include an additional function that is referred to as a computing client service function (comp CSF) 1304. The comp CSF 1304 may have both the control plane functionalities and user plane functionalities, and may interact with corresponding network side functions such as SOCF 1320, Comp CF 1324, Comp SF 1336, Data CF 1322, and/or Data SF 1332 for service discovery, request/response, compute task workload exchange, etc. The Comp CSF 1304 may also work with network side functions to decide on whether a computing task should be run on the UE 1302, the RAN 1308, and/or an element of the 6G CN 1310.

The UE 1302 and/or the Comp CSF 1304 may include a service mesh proxy 1306. The service mesh proxy 1306 may act as a proxy for service-to-service communication in the user plane. Capabilities of the service mesh proxy 1306 may include one or more of addressing, security, load balancing, etc.

Example Procedures

Figure 14:
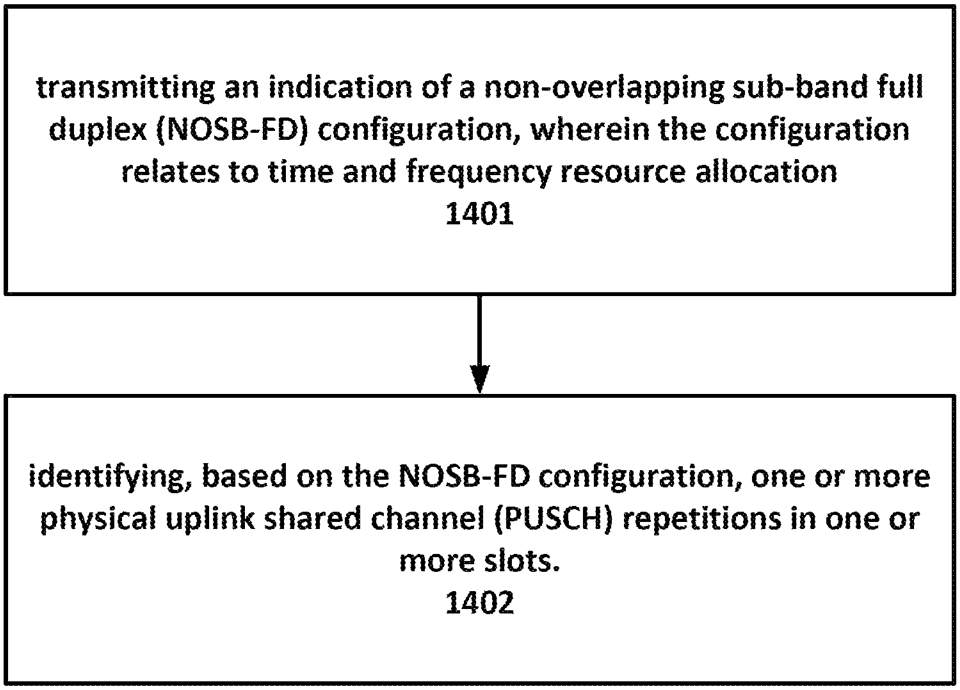
FIG. 14 depicts an example procedure for practicing the various embodiments discussed herein.

In some embodiments, the electronic device(s), network(s), system(s), chip(s) or component(s), or portions or implementations thereof, of FIGS. 10-13, or some other figure herein, may be configured to perform one or more processes, techniques, or methods as described herein, or portions thereof. One such process is depicted in FIG. 14. The process of FIG. 14 may be performed by a base station of a 5G network, a device that includes such a base station, or a portion thereof. The process may include transmitting, at 1401, an indication of a non-overlapping sub-band full duplex (NOSB-FD) configuration, wherein the configuration relates to time and frequency resource allocation; and identifying, at 1402 based on the NOSB-FD configuration, one or more physical uplink shared channel (PUSCH) repetitions in one or more slots.

Figure 15:
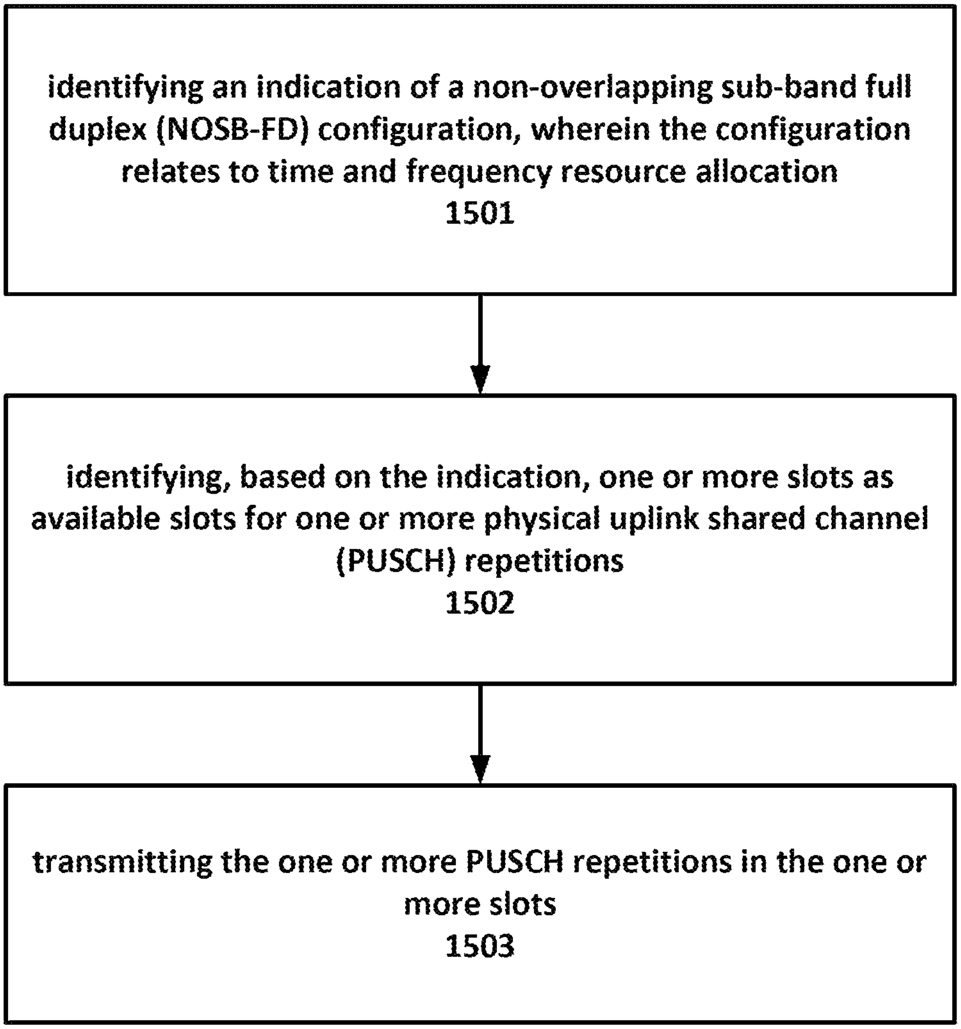
FIG. 15 depicts another example procedure for practicing the various embodiments discussed herein.

Another such process is depicted in FIG. 15. The process of FIG. 15 may be performed by a user equipment of a 5G network, a device that includes such a user equipment, or a portion thereof. The process may include identifying, at 1501, an indication of a non-overlapping sub-band full duplex (NOSB-FD) configuration, wherein the configuration relates to time and frequency resource allocation; identifying, at 1502 based on the indication, one or more slots as available slots for one or more physical uplink shared channel (PUSCH) repetitions; and transmitting, at 1503, the one or more PUSCH repetitions in the one or more slots.

Figure 16:
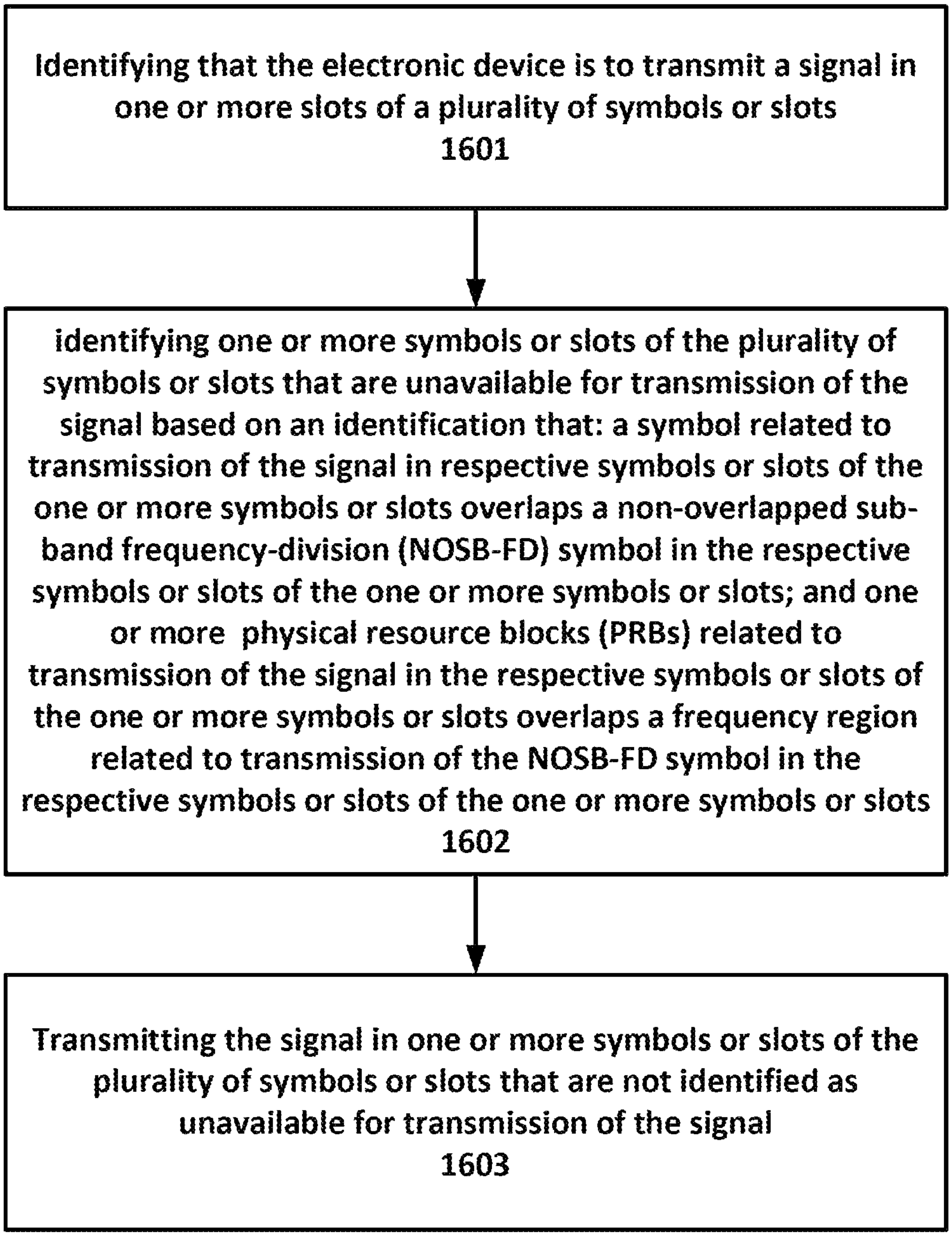
FIG. 16 depicts another example procedure for practicing the various embodiments discussed herein.

Another such process is depicted in FIG. 16. The process of FIG. 16 may be performed by an electronic device (e.g., a UE, a gNB, one or more elements of a UE and/or a gNB, and/or one or more electronic devices that include and/or implement a UE and/or gNB). The process may include identifying, at 1601, that the electronic device is to transmit a signal in one or more slots of a plurality of symbols or slots; identifying, at 1602, one or more symbols or slots of the plurality of symbols or slots that are unavailable for transmission of the signal based on an identification that: a symbol related to transmission of the signal in respective symbols or slots of the one or more symbols or slots overlaps a non-overlapped sub-band frequency-division (NOSB-FD) symbol in the respective symbols or slots of the one or more symbols or slots; and one or more physical resource blocks (PRBs) related to transmission of the signal in the respective symbols or slots of the one or more symbols or slots overlaps a frequency region related to transmission of the NOSB-FD symbol in the respective symbols or slots of the one or more symbols or slots; and transmitting, at 1603, the signal in one or more symbols or slots of the plurality of symbols or slots that are not identified as unavailable for transmission of the signal.

Figure 17:
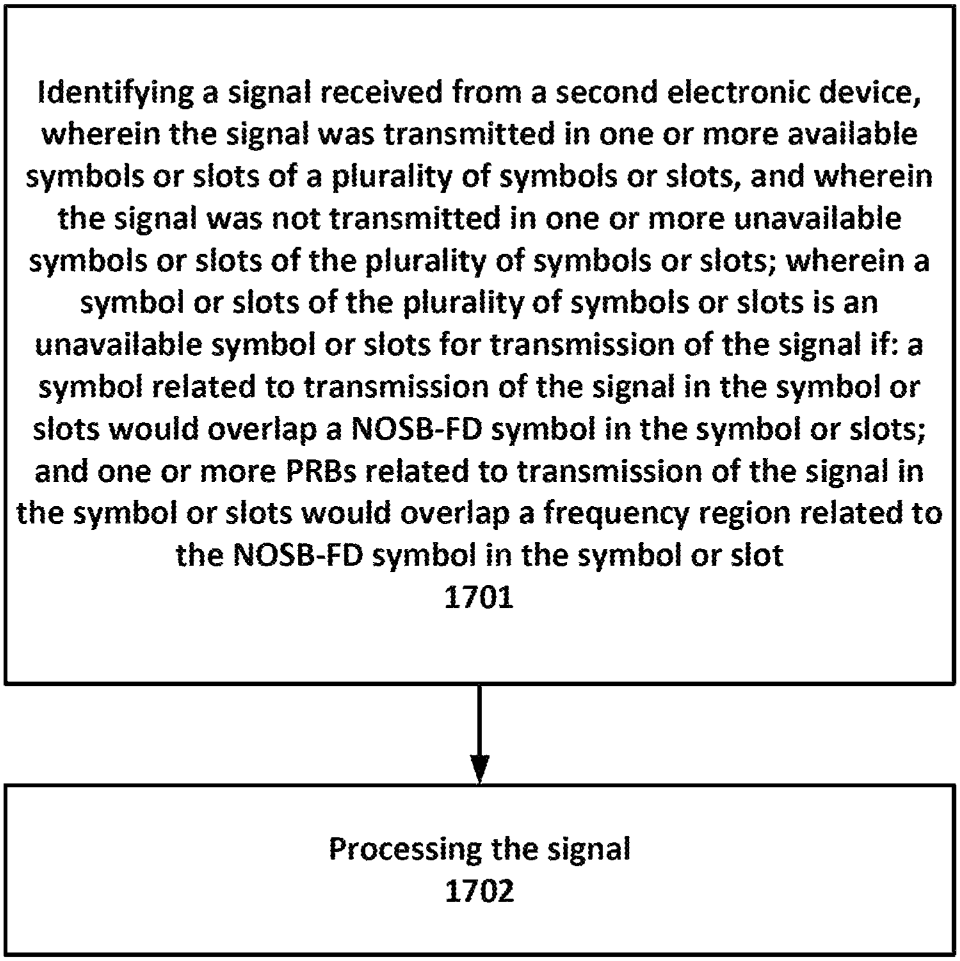
FIG. 17 depicts another example procedure for practicing the various embodiments discussed herein.

Another such process is depicted in FIG. 17. The process of FIG. 17 may be performed by an electronic device (e.g., a UE, a gNB, one or more elements of a UE and/or a gNB, and/or one or more electronic devices that include and/or implement a UE and/or gNB). The process may include identifying, at 1701, a signal received from a second electronic device, wherein the signal was transmitted in one or more available symbols or slots of a plurality of symbols or slots, and wherein the signal was not transmitted in one or more unavailable symbols or slots of the plurality of symbols or slots; and processing, at 1702, the signal; wherein a symbol or slot of the plurality of symbols or slots is an unavailable symbol or slot for transmission of the signal if: a symbol related to transmission of the signal in the symbol or slot would overlap a non-overlapped sub-band frequency-division (NOSB-FD) symbol in the symbol or slot; and one or more physical resource blocks (PRBs) related to transmission of the signal in the symbol or slot would overlap a frequency region related to the NOSB-FD symbol in the symbol or slot.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the system and method of wireless communication for a fifth generation (5G) or new radio (NR) system:

Configured, by gNB, a Non-Overlapping Sub-Band Full Duplex (NOSB-FD) configuration with time and frequency resource allocation, Determined, by UE, a slot as available slot for physical uplink shared channel (PUSCH) repetitions in accordance with the NOSB-FD configuration in time and frequency domain;

Example 2 may include the method of example 1 or some other example herein, wherein for unpaired spectrum, for the determination of available slots for multi-slot PUSCH transmission or PUCCH repetitions, a slot is not counted as available slot if at least one of the symbols indicated for a PUSCH or a PUCCH transmission of the multi-slot PUSCH transmission or PUCCH repetitions (respectively) overlaps with an NOSB-FD symbol and all the PRBs allocated for the PUSCH or the PUCCH transmission are not included within the UL subband, or if at least one of the symbols indicated for a PUSCH or a PUCCH transmission of the multi-slot PUSCH transmission or PUCCH repetitions (respectively) overlaps with an NOSB-FD symbol and at least one PRB allocated for the PUSCH or the PUCCH transmission falls within a DL subband if a DL subband is indicated explicitly or implicitly for a NOSB-FD symbol Example 3 may include the method of example 1 or some other example herein, wherein for unpaired spectrum, for the determination of available slots for multi-slot PUSCH transmission or PUCCH repetitions, a slot is not counted as available slot if the gap between last symbol of a PUSCH or a PUCCH transmission of the multi-slot PUSCH transmission or PUCCH repetitions (respectively) in the previous slot and the first symbol of a PUSCH or a PUCCH transmission of the multi-slot PUSCH transmission or PUCCH repetitions (respectively) is less than a threshold when the last symbol of the PUSCH or PUCCH in the previous slot and the first symbol of the PUSCH or PUCCH in the current slot are mapped to UL symbol or NOSB-FD symbols respectively (or vice-versa).

Example 4 may include the method of example 1 or some other example herein, wherein when numerology for active UL BWP used for the transmission of multi-slot PUSCH transmission and PUCCH repetitions is different from the UL subband for NOSB-FD operation, a slot is not counted as available slot if the symbols for PUSCH and PUCCH transmission overlaps with the NOSB-FD symbols.

Example 5 may include the method of example 1 or some other example herein, wherein a UE may not expect to be configured with NOSB-FD operation such that the numerology (comprising of SCS and CP type) used in the UL subband in an NOSB-FD symbol is different from that configured for the active UL BWP Example 6 may include the method of example 1 or some other example herein, wherein for PUSCH repetition type B in unpaired spectrum, a symbol may be determined as invalid symbol if the symbol overlaps with an NOSB-FD symbol and all the allocated PRBs for the PUSCH repetition are not included within the UL subband in the NOSB-FD symbol, or if the symbol overlaps with an NOSB-FD symbol and at least one PRB allocated for the PUSCH repetition falls within a DL subband if a DL subband is indicated explicitly or implicitly for a NOSB-FD symbol.

Example 7 may include the method of example 1 or some other example herein, wherein when numerology for active UL BWP used for the transmission of PUSCH repetition type B is different from the UL subband for NOSB-FD operation, the symbol is determined as invalid symbol if the symbols for PUSCH and PUCCH transmission overlaps with the NOSB-FD symbols.

Example 8 may include the method of example 1 or some other example herein, wherein for both Type 1 (4-step RACH) and Type 2 (2-step RACH) random access procedure in unpaired spectrum, if a UE is provided tdd-UL-DL-ConfigurationCommon, a PRACH occasion in a PRACH slot is valid if the PRACH occasion is within UL symbols or flexible symbols as indicated by tdd-UL-DL-Configuration-Common, or the PRACH occasion is within NOSB-FD symbols and the frequency resource of the PRACH occasion is within UL subband of NOSB-FD.

Example 9 may include the method of example 1 or some other example herein, wherein UE may not expect a PRACH occasion to overlap with a DL subband within NOSB-FD symbols if a DL subband is indicated explicitly or implicitly for a NOSB-FD symbol.

Example 10 may include the method of example 1 or some other example herein, wherein for Type 2 random access or 2-step RACH procedure in unpaired spectrum, if a UE is provided tdd-UL-DL-ConfigurationCommon, a PUSCH occasion is valid if all symbols of the PUSCH occasion are within UL symbols or flexible symbols as indicated by tdd-UL-DL-ConfigurationCommon, or are within NOSB-FD symbols and the frequency resource of the PUSCH occasion is within UL subband of NOSB-FD Example 11 may include the method of example 1 or some other example herein, wherein for Type 2 random access or 2-step RACH procedure, for unpaired spectrum, if numerology for initial or active UL BWP is different from that for the UL subband for NOSB-FD operation, a PUSCH occasion is not valid if it overlaps with the NOSB-FD symbols Example 12 may include the method of example 1 or some other example herein, wherein for configured grant PUSCH (CG-PUSCH) occasion for configured grant small data transmission (CG-SDT) operation in unpaired spectrum, if numerology for initial or active UL BWP is different from that for the UL subband for NOSB-FD operation, a PUSCH occasion may not be valid if it overlaps with a NOSB-FD symbol Example 13 may include the method of example 1 or some other example herein, wherein for Msg3 initial and retransmission, MsgA PUSCH transmission and CG-PUSCH transmission during CG-SDT operation, if time resource is within NOSB-FD symbols and the frequency resource is within UL subband of NOSB-FD, the frequency resource is determined in accordance with the UL subband of NOSB-FD Example 14 may include the method of example 1 or some other example herein, wherein when frequency hopping is indicated for MsgA PUSCH transmission and Msg3 initial transmission and retransmission, if MsgA PUSCH transmission and Msg3 initial transmission and retransmission is within NOSB-FD symbols, the frequency offset for the frequency hopping is determined based on BW for UL subband for NOSB-FD Example 15 may include the method of example 1 or some other example herein, wherein NOSB-FD symbols are not identified or used for UL transmissions until RRC configuration setup Example 16 may include the method of example 1 or some other example herein, wherein for the case of multi-symbol SRS transmissions that may include both UL or flexible and NOSB-FD symbols, the UE may be expected to transmit the first set of SRS symbols in UL/flexible or NOSB-FD symbols and drop the remaining SRS symbols in NOSB-FD or UL/flexible symbols respectively Example 17 may include the method of example 1 or some other example herein, wherein for unpaired spectrum, for the determination of available slot for SRS transmission, a slot is not counted as available slot if at least one of the symbols indicated for the SRS transmission overlaps with an NOSB-FD symbol and all the PRBs allocated for the SRS transmission are not included within the UL subband, or if at least one of the symbols indicated for the SRS transmission overlaps with an NOSB-FD symbol and at least one PRB allocated for the SRS transmission falls within a DL subband if a DL subband is indicated explicitly or implicitly for a NOSB-FD symbol, or if at least one of the symbols indicated for the SRS transmission overlaps with an NOSB-FD symbol and at least one PRB allocated for the SRS transmission falls within guard band if the guard band is indicated explicitly or implicitly for a NOSB-FD symbol, or if at least one of the symbols indicated for the SRS transmission overlaps with an NOSB-FD symbol and other symbols indicated for the SRS transmission overlaps with a non-NOSB-FD symbol.

Example 18 may include the method of example 1 or some other example herein, wherein the event which causes power consistency and phase continuity not to be maintained may include the case for multi-slot PUSCH and PUCCH repetitions, UE switches from NOSB-FD symbols to regular symbols or vice versa.

Example 19 may include the method of example 1 or some other example herein, wherein the event which causes power consistency and phase continuity not to be maintained may include the case for multi-slot PUSCH and PUCCH repetitions, UE switches from UL subband in NOSB-FD symbols or configured UL BWP for NOSB-FD symbols to active UL BWP, or vice versa.

Example 20 may include the method of example 1 or some other example herein, wherein the event which causes power consistency and phase continuity not to be maintained may include the case for multi-slot PUSCH and PUCCH repetitions, UE switches from UL subband in NOSB-FD symbols or configured UL BWP for NOSB-FD symbols to active UL BWP, or vice versa, where different set of power control parameters are configured for UL subband in NOSB-FD symbols or configured UL BWP for NOSB-FD symbols and active UL BWP.

Example 21 may include the method of example 1 or some other example herein, wherein the event which causes power consistency and phase continuity not to be maintained may include the case for multi-slot PUSCH and PUCCH repetitions, UE switches from NOSB-FD symbols to regular symbols or vice versa and if the frequency resource is different for NOSB-FD symbols and regular symbols.

Example 22 may include the method of example 1 or some other example herein, wherein the event which causes power consistency and phase continuity not to be maintained may include the case for multi-slot PUSCH and PUCCH repetitions, UE switches from NOSB-FD symbols to regular symbols or vice versa and if UL timing is different for NOSB-FD symbols and regular symbols.

Example 23 may include the method of example 1 or some other example herein, wherein the event which causes power consistency and phase continuity not to be maintained may include the case for multi-slot PUSCH and PUCCH repetitions, UE switches from NOSB-FD symbols to regular symbols or vice versa and if UL transmission power or spatial parameter is different for NOSB-FD symbols and regular symbols Example 24 may include the method of example 1 or some other example herein, wherein the aforementioned events may be considered as semi-static event, regardless of whether the NOSB-FD symbol is indicated by DCI or MAC-CE. In this case, UE is UE is mandatory to support restarting DM-RS bundling within a nominal time domain window.

Example 25 may include the method of example 1 or some other example herein, wherein PRACH occasions overlapping with one or more SBFD symbols may be configured by higher layers via RMSI or SIB1 or via dedicated RRC signaling for a UE that supports SBFD operations.

Example 26 may include the method of example 1 or some other example herein, wherein PRACH occasions which do not overlap with SBFD symbols may be configured via RMSI or SIB1 or via dedicated RRC signaling for a UE that supports SBFD operations.

Example 27 may include the method of example 1 or some other example herein, wherein when shared PRACH occasions are configured for the UEs that support SBFD operations and the UEs that do not support SBFD operation, separate PRACH preambles in the shared PRACH occasions can be allocated for the UEs that support SBFD operations and the UEs that do not support SBFD operation.

Example 28 may include the method of example 1 or some other example herein, wherein a UE may use either only a first type of PRACH occasions that are mapped to non-SBFD symbols or only a second type of PRACH occasions overlapping with one or more SBFD symbols, but not both, across different PRACH attempts depending on which type of PRACH occasions was used for the first PRACH attempt.

Example 29 may include the method of example 1 or some other example herein, wherein a UE may use either a first type of PRACH occasions that are mapped to non-SBFD symbols or a second type of PRACH occasions overlapping with one or more SBFD symbols across different PRACH attempts, regardless of the type of PRACH occasions was used for the first PRACH attempt Example 30 includes a method to be performed by a base station of a fifth generation (5G) network, wherein the method comprises: transmitting an indication of a non-overlapping sub-band full duplex (NOSB-FD) configuration, wherein the configuration relates to time and frequency resource allocation; and identifying, based on the NOSB-FD configuration, one or more physical uplink shared channel (PUSCH) repetitions in one or more slots.

Example 31 includes the method of example 30, wherein the NOSB-FD configuration includes at least one symbol that allows concurrent uplink and downlink transmission.

Example 32 includes a method to be performed by a user equipment of a fifth generation (5G) network, wherein the method comprises: identifying an indication of a non-overlapping sub-band full duplex (NOSB-FD) configuration, wherein the configuration relates to time and frequency resource allocation; identifying, based on the indication, one or more slots as available slots for one or more physical uplink shared channel (PUSCH) repetitions; and transmitting the one or more PUSCH repetitions in the one or more slots.

Example 33 includes the method of example 32, wherein the NOSB-FD configuration includes at least one symbol that allows concurrent uplink and downlink transmission.

Example 1B includes a method to be performed by an electronic device, wherein the method comprises: identifying that the electronic device is to transmit a signal in one or more slots of a plurality of symbols or slots; identifying one or more symbols or slots of the plurality of symbols or slots that are unavailable for transmission of the signal based on an identification that: a symbol related to transmission of the signal in respective symbols or slots of the one or more symbols or slots overlaps a non-overlapped sub-band frequency-division (NOSB-FD) symbol in the respective symbols or slots of the one or more symbols or slots; and one or more physical resource blocks (PRBs) related to transmission of the signal in the respective symbols or slots of the one or more symbols or slots overlaps a frequency region related to transmission of the NOSB-FD symbol in the respective symbols or slots of the one or more symbols or slots; and transmitting the signal in one or more symbols or slots of the plurality of symbols or slots that are not identified as unavailable for transmission of the signal.

Example 2B includes the method of example 1B, and/or some other example herein, wherein the NOSB-FD symbol is a symbol capable of simultaneous uplink (UL) and downlink (DL) transmission.

Example 3B includes the method of any of examples 1B-2B, and/or some other example herein, wherein the frequency region related to the NOSB-FD symbol is a downlink (DL) subband or a guard band related to the NOSB-FD symbol.

Example 4B includes the method of example 3B, and/or some other example herein, wherein at least one PRB related to transmission of the signal in the respective symbols or slots of the one or more symbols or slots overlaps with the frequency region related to the NOSB-FD symbol in the respective symbols or slots of the one or more symbols or slots.

Example 5B includes the method of example 3B, and/or some other example herein, wherein all PRBs related to transmission of the signal in the respective symbols or slots of the one or more symbols or slots overlaps with the frequency region related to the NOSB-FD symbol in the respective symbols or slots of the one or more symbols or slots.

Example 6B includes the method of any of examples 1B-5B, and/or some other example herein, wherein the signal is a physical uplink control channel (PUCCH) transmission, a physical uplink shared channel (PUSCH) transmission, or a sounding reference signal (SRS) transmission, or a PRACH transmission.

Example 7B includes the method of example 6B, and/or some other example herein, wherein a PRACH transmission in the NOSB-FD symbol is configured separately from a PRACH transmission in a non-NOSB-FD symbol.

Example 8B includes the method of any of examples 1B-7B, and/or some other example herein, wherein the signal relates to restart of demodulation reference signal (DMRS) bundling during a nominal time level based on an event for power inconsistency or phase un-continuity.

Example 9B includes the method of example 8B, and/or some other example herein, wherein the event relates to a switch, by a user equipment (UE), from use of NOSB-FD symbols to use of non-NOSB-FD symbol.

Example 10B includes the method of example 9B, and/or some other example herein, wherein the NOSB-FD symbols have a different frequency resource than the non-NOSB-FD symbols, the NOSB-FD symbols have a different uplink (UL) timing than the non-NOSB-FD symbols, the NOSB-FD symbols have a different transmission power than the non-NOSB-FD symbols, or the NOSB-FD symbols have a different spatial parameter than the non-NOSB-FD symbols.

Example 11B includes a method to be performed by an electronic device, wherein the method comprises: identifying a signal received from a second electronic device, wherein the signal was transmitted in one or more available symbols or slots of a plurality of symbols or slots, and wherein the signal was not transmitted in one or more unavailable symbols or slots of the plurality of symbols or slots; and processing the signal; wherein a symbol or slot of the plurality of symbols or slots is an unavailable symbol or slot for transmission of the signal if: a symbol related to transmission of the signal in the symbol or slot would overlap a non-overlapped sub-band frequency-division (NOSB-FD) symbol in the symbol or slot; and one or more physical resource blocks (PRBs) related to transmission of the signal in the symbol or slot would overlap a frequency region related to the NOSB-FD symbol in the symbol or slot.

Example 12B includes the method of example 11B, and/or some other example herein, wherein the NOSB-FD symbol is a symbol capable of simultaneous uplink (UL) and downlink (DL) transmission.

Example 13B includes the method of any of examples 11B-12B, and/or some other example herein, wherein the frequency region related to the NOSB-FD symbol is a downlink (DL) subband or a guard band related to the NOSB-FD symbol.

Example 14B includes the method of example 13B, and/or some other example herein, wherein at least one PRB related to transmission of the signal in the respective symbols or slots of the one or more symbols or slots overlaps with the frequency region related to the NOSB-FD symbol in the respective symbols or slots of the one or more symbols or slots.

Example 15B includes the method of example 13B, and/or some other example herein, wherein all PRBs related to transmission of the signal in the respective symbols or slots of the one or more symbols or slots overlaps with the frequency region related to the NOSB-FD symbol in the respective symbols or slots of the one or more symbols or slots.

Example 16B includes the method of any of examples 11B-15B, and/or some other example herein, wherein the signal is a physical uplink control channel (PUCCH) transmission, a physical uplink shared channel (PUSCH) transmission, or a sounding reference signal (SRS) transmission, or a PRACH transmission.

Example 17B includes the method of example 16B, and/or some other example herein, wherein a PRACH transmission in the NOSB-FD symbol is configured separately from a PRACH transmission in a non-NOSB-FD symbol.

Example 18B includes the method of any of examples 11B-17B, and/or some other example herein, wherein the signal relates to restart of demodulation reference signal (DMRS) bundling during a nominal time level based on an event for power inconsistency or phase un-continuity.

Example 19B includes the method of example 18B, and/or some other example herein, wherein the event relates to a switch, by a user equipment (UE), from use of NOSB-FD symbols to use of non-NOSB-FD symbol.

Example 20B includes the method of example 19B, and/or some other example herein, wherein the NOSB-FD symbols have a different frequency resource than the non-NOSB-FD symbols, the NOSB-FD symbols have a different uplink (UL) timing than the non-NOSB-FD symbols, the NOSB-FD symbols have a different transmission power than the non-NOSB-FD symbols, or the NOSB-FD symbols have a different spatial parameter than the non-NOSB-FD symbols.

Example Z01 may include an apparatus comprising means to perform one or more elements of a method described in or related to any of examples 1-20B, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-20B, or any other method or process described herein.

Example Z03 may include an apparatus comprising logic, modules, or circuitry to perform one or more elements of a method described in or related to any of examples 1-20B, or any other method or process described herein.

Example Z04 may include a method, technique, or process as described in or related to any of examples 1-20B, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-20B, or portions thereof.

Example Z06 may include a signal as described in or related to any of examples 1-20B, or portions or parts thereof.

Example Z07 may include a datagram, packet, frame, segment, protocol data unit (PDU), or message as described in or related to any of examples 1-20B, or portions or parts thereof, or otherwise described in the present disclosure.

Example Z08 may include a signal encoded with data as described in or related to any of examples 1-20B, or portions or parts thereof, or otherwise described in the present disclosure.

Example Z09 may include a signal encoded with a datagram, packet, frame, segment, protocol data unit (PDU), or message as described in or related to any of examples 1-20B, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-20B, or portions thereof.

Example Z11 may include a computer program comprising instructions, wherein execution of the program by a processing element is to cause the processing element to carry out the method, techniques, or process as described in or related to any of examples 1-20B, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core Network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbor Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBD | Candidate Beam Detection |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Responce |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |

-continued

| | |
|---|---|
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Sever |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |

-continued

| | |
|---|---|
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |

-continued

| | |
|---|---|
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |

-continued

| | |
|---|---|
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |

-continued

| | |
|---|---|
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSFCH | physical sidelink feedback channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |

-continued

| | |
|---|---|
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |

-continued

| | |
|---|---|
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |

-continued

| | |
|---|---|
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponce |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The invention claimed is:

1. An apparatus for a user equipment (UE) configured for operation in a New Radio (NR) network, the apparatus comprising:

processing circuitry, wherein to configure the UE for sub-band full duplex (SBFD) operation in the NR network, the processing circuitry is to:

identify that the UE is to transmit a signal in one or more slots of a plurality of symbols or slots;

identify one or more symbols or slots of the plurality of symbols or slots that are unavailable for transmission of the signal based on:

a symbol related to transmission of the signal in respective symbols or slots of the one or more symbols or slots overlaps an SBFD symbol in the respective symbols or slots of the one or more symbols or slots; and one or more physical resource blocks (PRBs) related to transmission of the signal in the respective symbols or slots of the one or more symbols or slots overlaps a frequency region related to transmission of the SBFD symbol in the respective symbols or slots of the one or more symbols or slots or a frequency region of a guard band of the SBFD symbol; and encode the signal for transmission in one or more symbols or slots of the plurality of symbols or slots that are not identified as unavailable for transmission of the signal; and memory coupled to the processing circuitry and configured to store the SBFD symbol.

2. The apparatus of claim 1, wherein the SBFD symbol is a symbol capable of simultaneous uplink (UL) and downlink (DL) transmission.

3. The apparatus of claim 1, wherein the frequency region related to the SBFD symbol is a downlink (DL) subband or a guard band related to the SBFD symbol.

4. The apparatus of claim 1, wherein the signal is a physical uplink control channel (PUCCH) transmission, a physical uplink shared channel (PUSCH) transmission, a sounding reference signal (SRS) transmission, or a physical random access channel (PRACH) transmission.

5. The apparatus of claim 4, wherein a PRACH transmission in the SBFD symbol is configured separately from a PRACH transmission in a non-SBFD symbol.

6. The apparatus of claim 1, wherein the signal relates to restart of demodulation reference signal (DMRS) bundling during a nominal time level based on an event for power inconsistency or phase discontinuity.

7. The apparatus of claim 6, wherein the event relates to a switch, by a user equipment (UE), from use of SBFD symbols to use of non-SBFD symbols.

8. The apparatus of claim 7, wherein the SBFD symbols have a different frequency resource than the non-SBFD symbols, the SBFD symbols have a different uplink (UL) timing than the non-SBFD symbols, the SBFD symbols have a different transmission power than the non-SBFD symbols, or the SBFD symbols have a different spatial parameter than the non-SBFD symbols.

9. The apparatus of claim 1, further comprising:

transceiver circuitry coupled to the processing circuitry; and one or more antennas coupled to the transceiver circuitry.

10. A non-transitory computer-readable storage medium that stores instructions for execution by one or more processors of a user equipment (UE), the instructions to configure the UE for sub-band full duplex (SBFD) operation in a New Radio (NR) network, and to cause the UE to perform operations comprising:

identifying that the UE is to transmit a signal in one or more slots of a plurality of symbols or slots;

identifying one or more symbols or slots of the plurality of symbols or slots that are unavailable for transmission of the signal based on:

a symbol related to transmission of the signal in respective symbols or slots of the one or more symbols or slots overlaps an SBFD symbol in the respective symbols or slots of the one or more symbols or slots; and one or more physical resource blocks (PRBs) related to transmission of the signal in the respective symbols or slots of the one or more symbols or slots overlaps a frequency region related to transmission of the SBFD symbol in the respective symbols or slots of the one or more symbols or slots or a frequency region of a guard band of the SBFD symbol; and encoding the signal for transmission in one or more symbols or slots of the plurality of symbols or slots that are not identified as unavailable for transmission of the signal.

11. The non-transitory computer-readable storage medium of claim 10, wherein the SBFD symbol is a symbol capable of simultaneous uplink (UL) and downlink (DL) transmission.

12. The non-transitory computer-readable storage medium of claim 10, wherein the frequency region related to the SBFD symbol is a downlink (DL) subband or a guard band related to the SBFD symbol.

13. The non-transitory computer-readable storage medium of claim 10, wherein the signal is a physical uplink control channel (PUCCH) transmission, a physical uplink shared channel (PUSCH) transmission, a sounding reference signal (SRS) transmission, or a physical random access channel (PRACH) transmission.

14. The non-transitory computer-readable storage medium of claim 13, wherein a PRACH transmission in the SBFD symbol is configured separately from a PRACH transmission in a non-SBFD symbol.

15. The non-transitory computer-readable storage medium of claim 10, wherein the signal relates to restart of demodulation reference signal (DMRS) bundling during a nominal time level based on an event for power inconsistency or phase un-continuity, wherein the event relates to a switch, by a user equipment (UE), from use of SBFD symbols to use of non-SBFD symbol, and wherein the SBFD symbols have a different frequency resource than the non-SBFD symbols, the SBFD symbols have a different uplink (UL) timing than the non-SBFD symbols, the SBFD symbols have a different transmission power than the non-SBFD symbols, or the SBFD symbols have a different spatial parameter than the non-SBFD symbols.

16. A user equipment (UE) configured for sub-band full duplex (SBFD) operation in a New Radio (NR) network, the UE comprising:

a front-end circuitry coupled to one or more antennas;

processing circuitry coupled to the front-end circuitry, the processing circuitry is to:

identify that the UE is to transmit a signal in one or more slots of a plurality of symbols or slots;

identify one or more symbols or slots of the plurality of symbols or slots that are unavailable for transmission of the signal based on:

a symbol related to transmission of the signal in respective symbols or slots of the one or more symbols or slots overlaps an SBFD symbol in the respective symbols or slots of the one or more symbols or slots; and one or more physical resource blocks (PRBs) related to transmission of the signal in the respective symbols or slots of the one or more symbols or slots overlaps a frequency region related to transmission of the SBFD symbol in the respective symbols or slots of the one or more symbols or slots or a frequency region of a guard band of the SBFD symbol; and encode the signal for transmission in one or more symbols or slots of the plurality of symbols or slots that are not identified as unavailable for transmission of the signal.

17. The UE of claim 16, wherein the SBFD symbol is a symbol capable of simultaneous uplink (UL) and downlink (DL) transmission.

18. The UE of claim 16, wherein the frequency region related to the SBFD symbol is a downlink (DL) subband or a guard band related to the SBFD symbol.

19. The UE of claim 16, wherein the signal is a physical uplink control channel (PUCCH) transmission, a physical uplink shared channel (PUSCH) transmission, a sounding reference signal (SRS) transmission, or a physical random access channel (PRACH) transmission.

20. The UE of claim 19, wherein a PRACH transmission in the SBFD symbol is configured separately from a PRACH transmission in a non-SBFD symbol.

21. The UE of claim 10, wherein the signal relates to restart of demodulation reference signal (DMRS) bundling during a nominal time level based on an event for power inconsistency or phase un-continuity, wherein the event relates to a switch, by a user equipment (UE), from use of SBFD symbols to use of non-SBFD symbol, and wherein the SBFD symbols have a different frequency resource than the non-SBFD symbols, the SBFD symbols have a different uplink (UL) timing than the non-SBFD symbols, the SBFD symbols have a different transmission power than the non-SBFD symbols, or the SBFD symbols have a different spatial parameter than the non-SBFD symbols.

* * * * *